United States Patent
Miksovsky et al.

(10) Patent No.: US 7,496,850 B2
(45) Date of Patent: *Feb. 24, 2009

(54) PAGE FUNCTION ARCHITECTURAL FRAMEWORK

(75) Inventors: Jan Thomas Miksovsky, Seattle, WA (US); David Joel Sheldon, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 730 days.

This patent is subject to a terminal disclaimer.

(21) Appl. No.: 11/097,426

(22) Filed: Mar. 31, 2005

(65) Prior Publication Data

US 2005/0172238 A1 Aug. 4, 2005

Related U.S. Application Data

(63) Continuation of application No. 10/083,023, filed on Feb. 26, 2002, now Pat. No. 6,973,624.

(51) Int. Cl.
*G06F 3/00* (2006.01)
*G06F 3/048* (2006.01)
*G06F 9/44* (2006.01)

(52) U.S. Cl. .............. 715/762; 715/738; 715/804; 717/162; 719/331

(58) Field of Classification Search ............ 715/234, 715/762, 738, 804; 717/162; 719/331
See application file for complete search history.

(56) References Cited

U.S. PATENT DOCUMENTS

| | | | |
|---|---|---|---|
| 4,982,344 A | 1/1991 | Jordan | |
| 5,574,846 A | 11/1996 | Yoshimura et al. | |
| 6,023,701 A | 2/2000 | Malik et al. | |
| 6,104,393 A | 8/2000 | Santos-Gomez | |
| 6,262,729 B1 | 7/2001 | Marcos et al. | |
| 6,282,547 B1 | 8/2001 | Hirsch | |
| 6,334,131 B2 | 12/2001 | Chakrabarti et al. | |
| 6,564,375 B1 | 5/2003 | Jiang | |
| 6,819,343 B1 | 11/2004 | Sobeski et al. | |
| 6,907,574 B2 | 6/2005 | Xu et al. | |
| 6,918,088 B2 | 7/2005 | Clark et al. | |
| 6,999,959 B1 | 2/2006 | Lawrence et al. | |
| 7,024,631 B1* | 4/2006 | Hudson et al. | 715/763 |
| 7,047,241 B1 | 5/2006 | Erickson | |
| 7,203,948 B2 | 4/2007 | Mukundan et al. | |
| 7,216,297 B1 | 5/2007 | Douglis et al. | |
| 2002/0054138 A1 | 5/2002 | Hennum | |
| 2002/0070961 A1 | 6/2002 | Xu et al. | |

(Continued)

OTHER PUBLICATIONS

Microsoft Corporation, "Microsoft Inductive User Interface Guidelines," Microsoft Library, Feb. 9, 2001, <http://msdn.microsoft.com/library/enus/dnwindev/html/iuiguidelines.asp?frame=true> [retrieved Jan. 8, 2002].

(Continued)

*Primary Examiner*—Ting Zhou
(74) *Attorney, Agent, or Firm*—Workman Nydegger

(57) ABSTRACT

An architectural software framework is provided for creating Web-style application software incorporating protocols and means for expansion and interfacing with other Web-style programs, as well as a reusable basic programming structure, including abstract and concrete data types, that assist in building Web-style applications. The architectural software framework includes a page function and frame. Each Web-style application includes one or more page functions which communicate via the frame.

6 Claims, 31 Drawing Sheets

U.S. PATENT DOCUMENTS

| | | | |
|---|---|---|---|
| 2002/0156814 A1* | 10/2002 | Ho | 707/514 |
| 2002/0196273 A1 | 12/2002 | Krause | |
| 2003/0084120 A1 | 5/2003 | Egli | |
| 2004/0153627 A1 | 8/2004 | Miksovsky | |

OTHER PUBLICATIONS

Microsoft Corporation, "Microsoft Inductive User Interface Guidelines," Microsoft Library, Feb. 9, 2001, <http://msdn.microsoft.com/library/en-us/dnwinderv/html/iuiguidelines.asp?frame=true> [retrieved Jan. 8, 2002].

Office Action dated Jun. 19, 2007 cited in related U.S. Appl. No. 10/716,188 (Copy Attached).

Notice of Allowance dated May 6, 2008 cited in related U.S. Appl. No. 10/716,188 (Copy Attached).

* cited by examiner

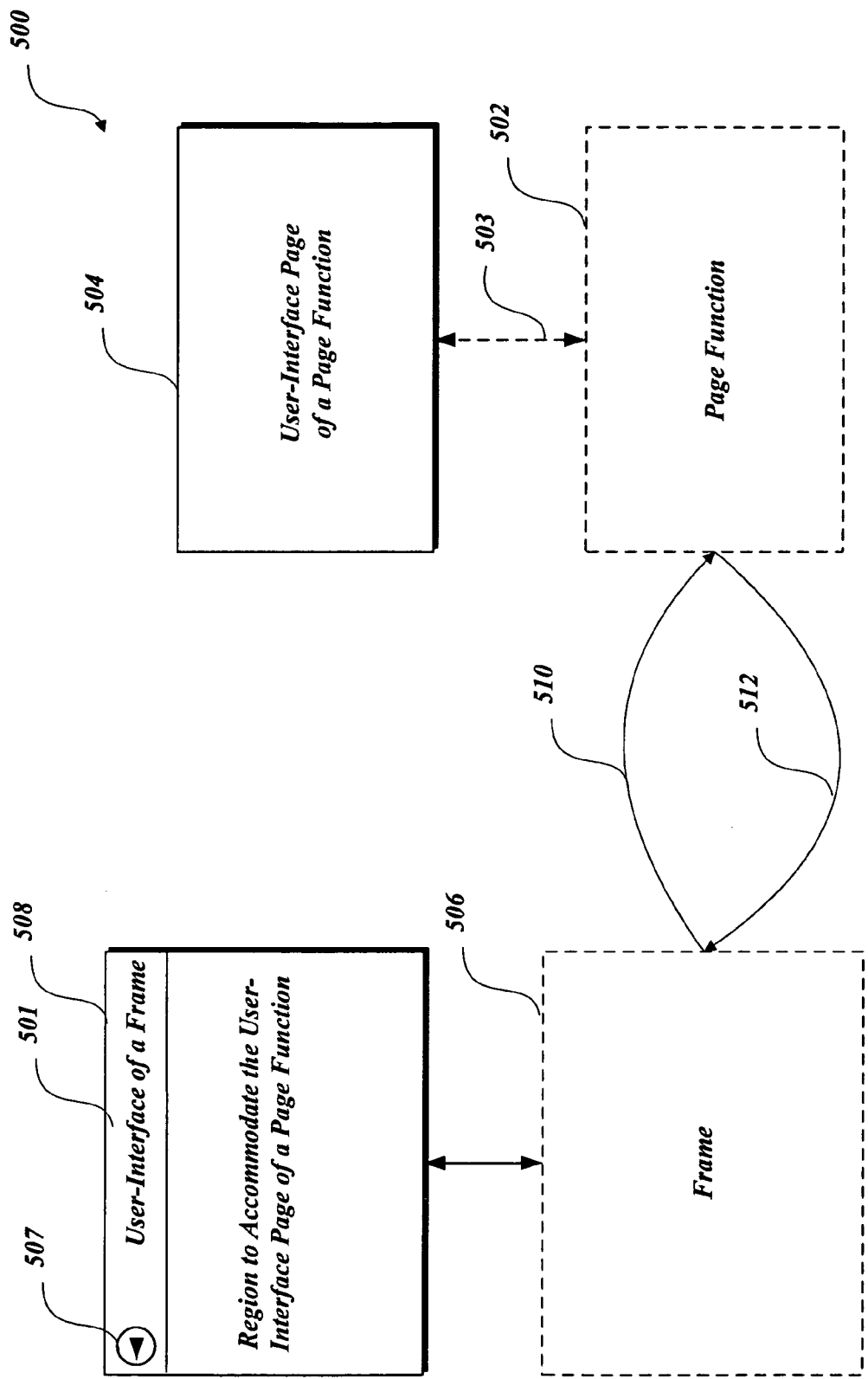

US 7,496,850 B2

PAGE FUNCTION ARCHITECTURAL FRAMEWORK

CROSS-REFERENCE TO A RELATED APPLICATION

This application is a continuation of application Ser. No. 10/083,023, filed Feb. 26, 2002, which is incorporated herein by reference.

FIELD OF THE INVENTION

The present invention relates generally to an architectural software framework for creating Web-style applications, and more particularly, to the design of Web-style application software incorporating protocols and means for expansion and interfacing with other Web style programs as well as a reusable basic programming structure, including abstract and concrete data types, that assists in building Web-style applications.

BACKGROUND OF THE INVENTION

A user interface is a portion of a program with which a user interacts. Types of user interfaces, or UIs (in the idioms of computer engineering), include command-line interfaces, menu-driven interfaces, and graphical user interfaces. A windowing environment, which uses a graphical user interface, is an operating system or shell that presents the user with specially delineated areas of the screen called windows, which may be resized and moved around on the display of a computer. The Macintosh OS and Microsoft Windows are both examples of windowing environments. Graphical user interfaces are one of the means by which a user interacts with an application, which is a program designed to assist in the performance of a specific task, such as word processing, accounting, or inventory management. Graphical user interfaces allow a user's action in one window to cause an application to open another window. In such a case, the original window, which caused the new window to be opened, appears behind the new window. Many applications allow an unlimited number of such windows to be open at the same time. However, a user can generally interact only with the top-most window. As a result, the top-most window is said to be the active window. All other windows are said to be inactive windows.

Windows can be classified as modeless or modal. If an active window is modeless, a user is able to make any inactive window active by using a pointing device to click on any portion of an inactive window that is visible to a user. If, however, an active window is modal, a user cannot activate other windows until the active window is closed. For example, a user may have to complete a task in the active window, which is modal, such as filling in some fields and pressing an OK button to close the active window before other windows can be activated.

An active window that is modal may open another window, which will become active and modal, on top of it, and so on. Only the top-most active window that is modal is active. All other windows, whether they are modal or modeless, are inactive and cannot be activated until the active modal window is closed. Applications use modal windows as detours away from some primary task to perform an auxiliary task. Once a user closes a modal window, the operating system reactivates the original window that the user employed to activate the modal window. Returning a user to the original window effectively completes the detour, thereby allowing a user to continue with his original task.

FIG. 1 illustrates an interactive help utility called a wizard 100, which appears as a modal window, within an application. The wizard generates windows that guide a user through each step of a particular task, such as starting up a word processing document in the correct format for a business letter. The GUI window of the wizard 100, like other window applications, includes a title bar 102, which is a horizontal space at the top of a window that contains the name of the window. Appearing as a square button in the right corner of the title bar 102 with an X mark on it is a close button 104. Clicking on the close button 104 cancels the wizard 100. The wizard 100 also includes a number of screens 106, 108, and 110, that present information and receive input (information) from a user during the performance of the task defined by the wizard. The screens 106-110 may be navigated back and forth using a back button 112 or a next button 114. After collecting sufficient information from a user, the wizard 100 presents a finish button 115. A user clicking the finish button causes the wizard 100 to proceed to perform the wizard's task. At any point, a user may exit from the wizard 100 by clicking on a cancel button 116. Clicking on the cancel button causes the wizard 100 to quit and returns the user to the application that originally invoked the wizard 100.

Wizards and similar programs work fine for the purpose for which they were designed. However, because of various constraints, wizard-type programs are typically not used in user interfaces for interacting with various applications. The main problem with the wizard-type programs is their modal nature. When a wizard presents a question to a user, the user must contemporaneously have sufficient information to answer the question or must cancel the entire process. Because of the modal nature of wizard-type programs, a user cannot reactivate the application that has invoked the wizard or other applications to gather information with which to answer a question presented by the wizard. In various usability studies, users have complained that they feel forced down a particular, and unknowingly lengthy, path by a wizard. In certain wizards, the next button 114 is unclickable until a user has answered the presented question, thereby preventing the user from skipping a question that the user has insufficient information to answer. Another problem is the lengthy linear sequence of screens of wizards. A user may have sufficient information to answer many screens of questions only to find out near the end of the wizard screens that a question cannot be answered, thereby forcing the user to quit the wizard prior to completion. A further problem is that wizards must follow a rigid dialog template without deviation. Besides the fixed screen dimensions within which the wizard is presented to the user, navigational facilities within the wizard are limited to the back button 112, the next button 114, or the cancel button 116. Given these constraints, a wizard is more appropriately used in the context of a help utility rather than as a user interface for complex applications.

The linear rigidity employed by wizards to force a user to interact in a specific manner in order to accomplish a desired task is overcome by Web-style applications, such as Microsoft Money 2000. An example of a Web-style application 200 is shown in FIG. 2. A Web-style application is not a Web site, but it shares many properties in common with Web sites. The user interface of the Web-style application 200 shown in FIG. 2 consists of a plurality of full-screen pages 202, 220, and 230, shown in a shared frame 201, with tools for navigation, such as a back button 206, a forward button 208, and a Home button 210. The user interface of the Web-style application 200 may also include a title bar and a close box like the wizard 100, but are not shown here for brevity purposes. The shared frame 201 includes a navigation bar 204 that contains the name of the page being displayed in the shared frame 201, as well as the navigation controls i.e., the Back button 206, the Forward button 208 and the Home button 210.

The first page of the Web-style application 200 is a Home page 202 which includes a list of tasks that a user can select to be performed. The tasks are invoked by clicking on a hyperlink, such as a pay a bill hyperlink 212, a balance an account hyperlink 214, or a track a stock portfolio hyperlink 216. When one of these hyperlinks, 212-216, is activated, a "process," which consists of a page or series of pages that are employed to perform the selected task, is invoked.

In the example shown in FIG. 2, a process 218 is invoked when the user selects the pay a bill hyperlink 212. The invoked process 218 includes two pages 220, 230. A number of exemplary payable bills are presented on the first page 220, namely, a Cablevision bill 222, an AT&T bill 224, and a City Power bill 226. Each of these bills 222-226 is presented as a hyperlink. Clicking on one of these hyperlinks causes the bill associated with the hyperlink to be paid, as noted in the title bar 204. The first page 220, additionally, allows a user to view bills that are one month away by clicking on a hyperlink 228. When this hyperlink 228 is clicked on, the second page 230 is shown. The second page lists an exemplary bill from MSN. This bill is associated with a further hyperlink 232. Clicking on the further hyperlink 232 causes the bill from MSN to be paid (as noted in the title bar 204). When a user is finished with the bill paying task, the user may click on another hyperlink 234 titled, for example, "I am done paying bills". When this hyperlink is clicked, the Web-style application 200 automatically represents the Home page 202, i.e., the page from which the user initially launched the bill paying process 218.

This behavior of always returning a user to the page that launched the invoked process is not achieved through a hard-coded hyperlink on the final screen of the process, such as the last page 230 of the process 218. This is because the destination of the final hyperlink may vary, and a hard-coded hyperlink cannot anticipate the precise launching page from which a process is invoked. Instead, the Web-style application 200 implements the behavior of always returning a user to the page that invoked a process in a different way. More specifically, the Web-style application 200 maintains a stack of launching pages that are independent of the normal navigation offered by the back button 206 and the forward button 208. When a user launches a process, the launching page is pushed onto the stack. When a user clicks the done hyperlink on the final screen of the process, the Web-style application 200 pops the most recent launching page off the stack and returns the user to that page.

Unlike the linear rigidity associated with the wizard 100 illustrated in FIG. 1 and discussed above, at any point during the operation of the Web-style application 200, a user may navigate backward or forward from any page, even the pages included in an invoked process, such as the process 218. When a user does navigate away from a page in a process, the page that launched the invoked process remains active on the stack. Thus, the user can still complete the process by backing up to the page where he left it and will always be returned to the launching page because of the stack. This process allows a user to make a detour or back up, and then go on with a process. Thus, the non-linear-structure of Web-style applications overcomes many of the limitations of wizard-type applications.

The dynamism of the user interface of a Web-style application that allows a user exploration is ensured by the steadfastness of the stack in that the stack always returns the user to the launching page from which a process is invoked. While a significant advance, the constant interposition of launching pages can hinder Web-style application from forming super-processes that comprise the functionalities of two or more processes. This hindrance is illustrated in FIG. 3A, which shows a Web-style application 300 at a macroscopic level, i.e., without a shared frame and page details. A Home page 302 includes a hyperlink that, when clicked, brings a user to a Launching page 304. The Launching page 304 contains one or more hyperlinks, including a hyperlink to invoke a first process 306. When the first process 306 is invoked, the Launching page 304 is placed on a stack, and the first page, page A 308, of the process 306 is displayed. As discussed before, a user may navigate away from the pages of the process 306, or the user may navigate through the first process 306 by working with the pages of the process, namely, page A 308, page B 310, and the final page, page C 312, to complete the task associated with the process. The Launching page 304 is popped from the stack and represented to a user when a hyperlink on first page C 312 of the first process 306 is selected to indicate the completion of the task associated with the process 306.

If the user desires to perform a second task associated with a second process 322, the user must click another hyperlink contained in the Launching page 304. Clicking this hyperlink causes the first page of the process 322, page X 316, to be displayed. From page X 316, the user can progress to the next page Y 318 and then to the final page, page Z 320, to complete the second task. Similar to the invocation of the first process 306, the Launching page 304 is again pushed onto the stack prior to the presentation of the pages of the second process 322. At the conclusion of the second task, the Launching page 304 once again is popped from the stack and represented to the user.

In the past it has not been possible for a designer of the user interface of the Web-style application 300 shown in FIG. 3 to combine the functionality of a first process 306 with the functionality of a Web-style application, such as a second process 322 while keeping each of the process pages 308-320 separate so that each page can be used in other contexts. The undesired interposition of the Launching page 304 in the Web-style application 300 prevented a seamless user interface experience between the presentation of the pages of the first process 306 and the presentation of the pages of the second process 322. The only way to provide the functionalities of both of the processes 306, 322 is to combine the pages of each of the two processes 306, 322 in another process.

Besides the problem of assembling two or more processes without interference by the interposition of the launching pages, the processes of previously developed Web-style applications are designed with no thought that these processes may be reused to form new functionalities in other applications. This problem is better illustrated in FIG. 3B, which shows a partial navigational flow 326 is taken from a Web-style application of the type shown in FIG. 3A. The partial navigational flow 326 includes the Launching page 304 from which the first process 306 is invoked. The first page of the first process 306 is page A 308, and the remaining pages are page B 310 and page C 312. When exiting from the process 306, the Launching page 304 is popped from the stack and represented to the user.

As shown, each of the pages 304-312 is tightly coupled to a database 326 where data is shared. To use the database 326, each of the pages 304-312 must intimately know all the data that can be written to or read by the other pages. Otherwise, one page could mistakenly access and change data in the wrong place in the database 326 resulting in the corruption to the rest of the pages and possibly detrimental repercussions to the Web-style application 300. Unfortunately, this requirement results in the data in the database 326 being vulnerably exposed by necessity to all of the pages 304-312. The lines 328A-328J are included to show the data access paths of the pages 304-312.

To summarize, in the past, Web style applications were developed separately from one another. It was not envisioned that the processes employed by Web-style applications might be used outside the context of Web-style applications for which they were designed. This resulted in Web-style application processes being tightly coupled to a data source, such as the database 326, which is specific to a particular application domain. AS a result, prior Web-style applications are Web-like only in that the pages and the pages of the processes are linked together in a complex, non-sequential web of associations in which the user may browse in a single application. But a process in one Web-style application cannot access a process in another Web-style application unless the data of one application is completely exposed to the other application. This presents a serious security problem. Additionally, this is similar to the proscription in computer science in the use of global variables to store states across functions because global variables limit reuse and makes understanding code difficult.

The problem of tight coupling is further illustrated in FIG. 3C, which illustrates a first process 306 of the type associated with the Web-style application 300 shown in FIG. 3A and a further process 336 associated with another Web-style application. As discussed before, the pages of the first process 306 (page A 308, page B 310 and page C 312) are tightly coupled to a first database 326. The pages of the further process 336, which includes page U 338, page V 340, and page W 342, are tightly coupled to another database 344. The lines 328C-328G are included to show the data access paths of the pages of the first process 306, and the lines 346A-346F are included to show the data access paths by the pages of the further process 336. Given the tight coupling between the first process 306 and the first database 326, and the tight coupling of the further process 336 and the second database 344, it is difficult to combine the functionality of the first process 306 and the functionality of the further process 336. To do so would require a user interface designer to be intimately familiar with the relationship between the first process 306 and the first database 326, and the further process 336 and the second database 344. Not only would this be a time-consuming undertaking, but it may also hinder the efficiency of designing and improving Web-style applications.

As noted above, exposure of the data of a process poses a security risk. For example, suppose that the first process 306 and its database 326 are designed by Corporation A, and the further process 336 and its database 344 are designed by Corporation B. Suppose further that it would be synergistic for the functionality of the first process 306 to invoke the functionality of the further process 336. The only way to do so at present is for Corporation A to completely expose the data associated with the first process 306 stored in its database 326 to Corporation B, and for the Corporation B to completely expose the data associated with the further process 336 stored in its database 344 to Corp oration A. Such exposure creates a security risk for Web-style applications designed by both Corporations A, B.

FIG. 3D illustrates another problem associated with the tight coupling design of previously developed Web-style applications. FIG. 3D illustrates a first process 306 tightly coupled with its database 326 as discussed before. Another process 350, which comprises page R 352, page S 354, and page T 356, is tightly coupled to a related database 360. Lines 358A-358F are included to illustrate the data access paths of the pages of the other process 350 to its database 360. Another level of tight coupling is shown by lines 348A-348F. These lines are illustrative of the data accesses between the pages of the first process 306 and the pages of the other process 350. FIG. 3D shows that there may be three levels of tight coupling, each of which may inhibit and hinder the ability of a user interface designer to reuse processes of previously developed Web-style applications. One level is the coupling between the first process 306 and its database 326. Another level of tight coupling is between the other process 350 and its database 360, and the final level is the coupling between the first process 306 and the other process 350. If a user interface designer desires to use either the first process 306 or the other process 350 with another Web-style application, the designer will find it extremely difficult to do so. The only way to reuse either the first process 306 or the other process 350 is to completely expose the data of both processes, which, as noted above, creates a security risk.

Thus, there is a need for an architectural software framework for designing Web-style applications that incorporates protocols and means for expansion and interfacing with other Web-style programs, as well as a reusable basic programming structure that assists in building secured Web-style applications, while avoiding the foregoing and other problems associated with existing Web-style applications.

SUMMARY OF THE INVENTION

In accordance with this invention, in a computer system including a display, a user input facility, and an application for presenting user interfaces on the display, the user interfaces are associated with page functions. A user interface programming system has a computer-readable medium that has stored thereon a data type being defined as a frame. The frame comprises a set of frame services that includes a navigate service and a finish service. The navigate service is invokable by a page function to navigate to another page function to perform a task. The finish service is invokable by the other page function to communicate to the frame that the task has been performed. There is also a frame data structure for storing information that identifies each page function to which the frame has navigated. The frame data structure shows the originator relationship among page functions.

In accordance with other aspects of the present invention, in a computer system including a display, a user input facility, and an application for presenting user interfaces on the display, one or more page functions are stored on a computer-readable medium as a data type. Each page function comprises a set of exposed attributes accessible externally to the page function. A first subset of the set of exposed attributes defines types of information receivable by the page function. A second subset of the set of exposed attributes defines types of information returnable by the page function. Each page function further comprises a set of page function services including an activate service and a complete service. Both services are invokable to execute a decision selected from a group consisting of a decision to finish, a decision to show a user interface page, and a decision to create a new page function. Each page function further includes a binding selectively coupled to a user interface page.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5A is a block diagram illustrating pieces of an architectural software framework to design Web-style applications, and particularly, a frame, a user interface of the frame, a page function, and a user interface page of the page function, according to one embodiment of the present invention.

DETAILED DESCRIPTION OF THE PREFERRED EMBODIMENT

Figure 4:
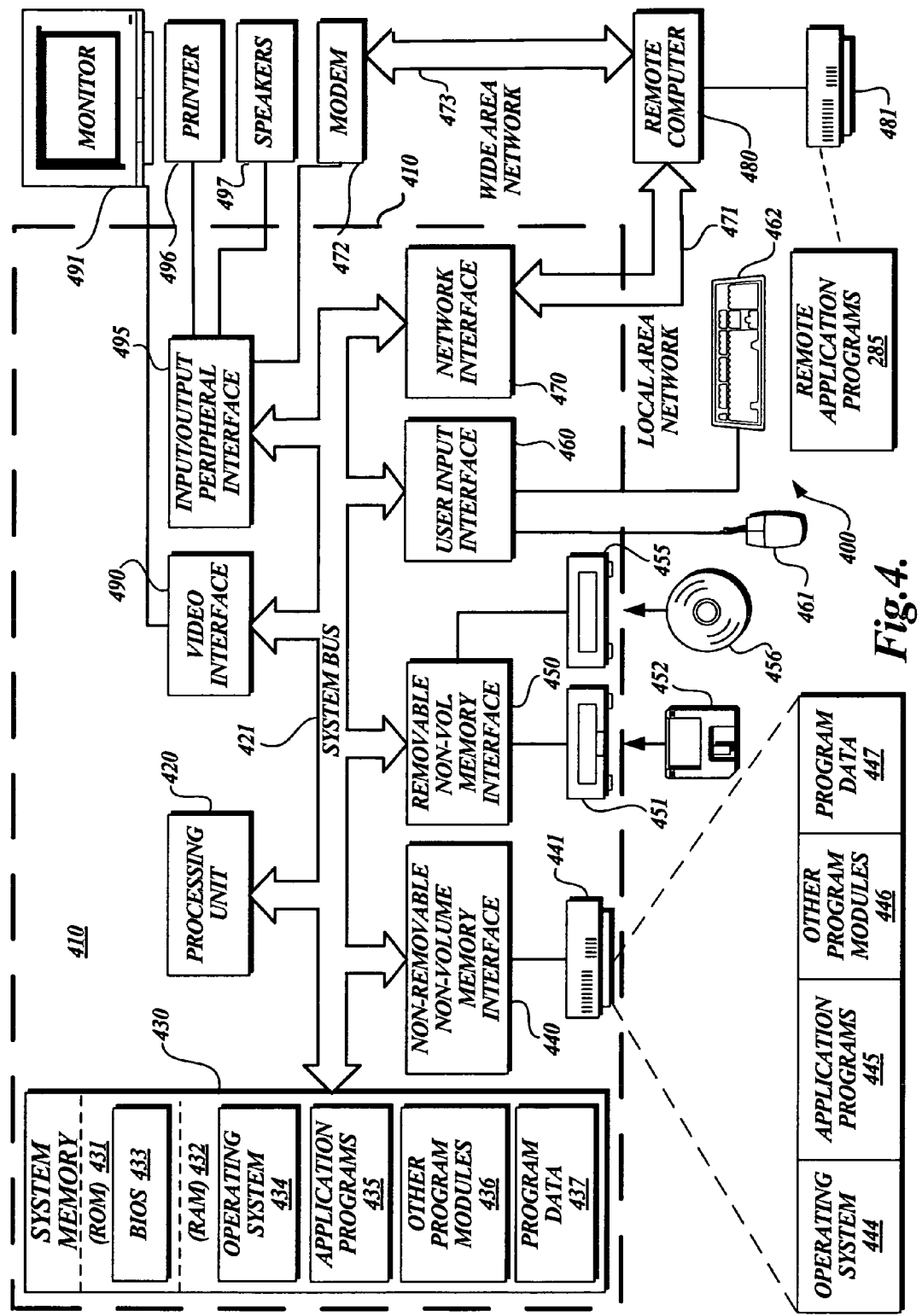
FIG. 4 is a block diagram illustrating a computing device.

FIG. 4 illustrates an example of a suitable computing system environment 400 on which the invention may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of the illustrated and described components.

The invention is operational with numerous other general purpose or special purpose computing system environments or configurations. Examples of well-known computing systems, environments and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention is described in the general context of computer-executable instructions, such as program modules being executed by a computer. Generally, program modules include routines, programs, objects, components, data structures, etc., that perform particular tasks or implement particular abstract data types.

The invention may also be practiced in distributed computing environments where tasks are performed by remote processing devices that are linked through a communications network. In a distributed computing environment, program modules may be located in both local and remote computer storage media, including memory storage devices.

With reference to FIG. 4, a system for implementing the invention includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures, including a memory bus or memory controller, a peripheral bus, and a local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tapes, magnetic disk storage or other magnetic storage devices, or any other computer storage media. Communication media typically embodies computer readable instructions, data structures, program modules or other data in a modulated data signal, such as a carrier wave or other transport mechanism that includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF infrared and other wireless media. A combination of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible and/or presently being operated on, by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates the hard disk drive 441 that reads from or writes to non-removable, nonvolatile magnetic media, the magnetic disk drive 451 that reads from or writes to a removable, nonvolatile magnetic disk 452, and an optical disk drive 455 that reads from or writes to a removable, nonvolatile optical disk 456, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital videotapes, solid state RAM, solid state ROM, and the like. The hard disk drive 441 is typically connected to the system bus 421 through a non-removable memory interface, such as interface 440, and the magnetic disk write 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436 and program data 437. Operating system 444, application programs 445, other program modules 446, and program data 447 are given different numbers here to illustrate that, at a minimum, they are different copies. A user may enter commands and information into the computer 410 through input devices, such as a keyboard 462 and pointing device 461, commonly referred to as a mouse, trackball, or touch pad. Other input devices (not shown) may include a microphone, joystick, game pad, satellite dish, scanner, or the like. These and other input devices are often connected to the processing unit 420 through a user input interface 460 that is coupled to the system bus, but may be connected by other interface and bus structures, such as a parallel port, game port, or universal serial bus (USB). A monitor 491 or other type of display device is also connected to the system bus 421 via an interface, such as a video interface 490. In addition to the monitor, computers may also include other peripheral output devices, such as speakers 497 and printer 496, which may be connected through an input/output peripheral interface 495.

The computer 410 may operate in a networked environment using logical connections to one or more remote computers, such as a remote computer 480. The remote computer 480 may be a personal computer, a server, a router, a network PC, a peer device, or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such network environments are commonplace in offices, enterprise-wide computer networks, intranets, and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the input/output peripheral interface 495, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are for illustrative purposes only and other means of establishing a communications link between the computers may be used.

As illustrated in FIG. 5A, the invention provides an architectural software framework 500 designed to overcome and/or reduce the problems discussed in the Background of the Invention. The architectural software framework 500 creates Web-style applications. Two of the major pieces of the framework, namely a frame 506 and a page function 502, are illustrated in FIG. 5A and described below.

Each Web-style application includes one or more page functions, only one of which is illustrated in FIG. 5A. The illustrated page function 502 includes a user interface page 504 that contains user interface elements, such as one or more hyperlinks, for interacting with a user. While the pages of prior Web-style applications have a Web-like user interface, they lack the software component formed by the page function 502. The user interface page 504 may be bound to the page function 502 by a binding 503. The binding 503 allows the page function 502 to be associated with the user interface page 504 or not associated therewith. One suitable technique for creating a binding includes setting a pointer variable in the page function 502 that points to the user-interface page 504. Other binding techniques may also be employed. The ability of the page function 502 to be selectively associated with a user interface page 504 allows the page function 502 to be invisible to a user and act as an intermediary to seamlessly join together the functionalities of page functions.

To invoke the page function 502 to perform a certain task, a protocol provided by the architectural software framework 500 is followed. A line 510 represents the invocation of the page function 502. The invocation of the page function 502 generally requires that one or more parameters be supplied to the page function 502 in order for it to perform a designated task. Once the page function 502 is finished with the task, the page function 502 returns one or more values associated with the performed task. This is represented by a line 512. This protocol for invoking the page function 502 and returning the result of the performed task allows the page function 502 to be combined with other page functions to create functionality different from the one offered by the page function 502. Additionally, this protocol allows the page function 502 to interface with other page functions.

Figure 2:
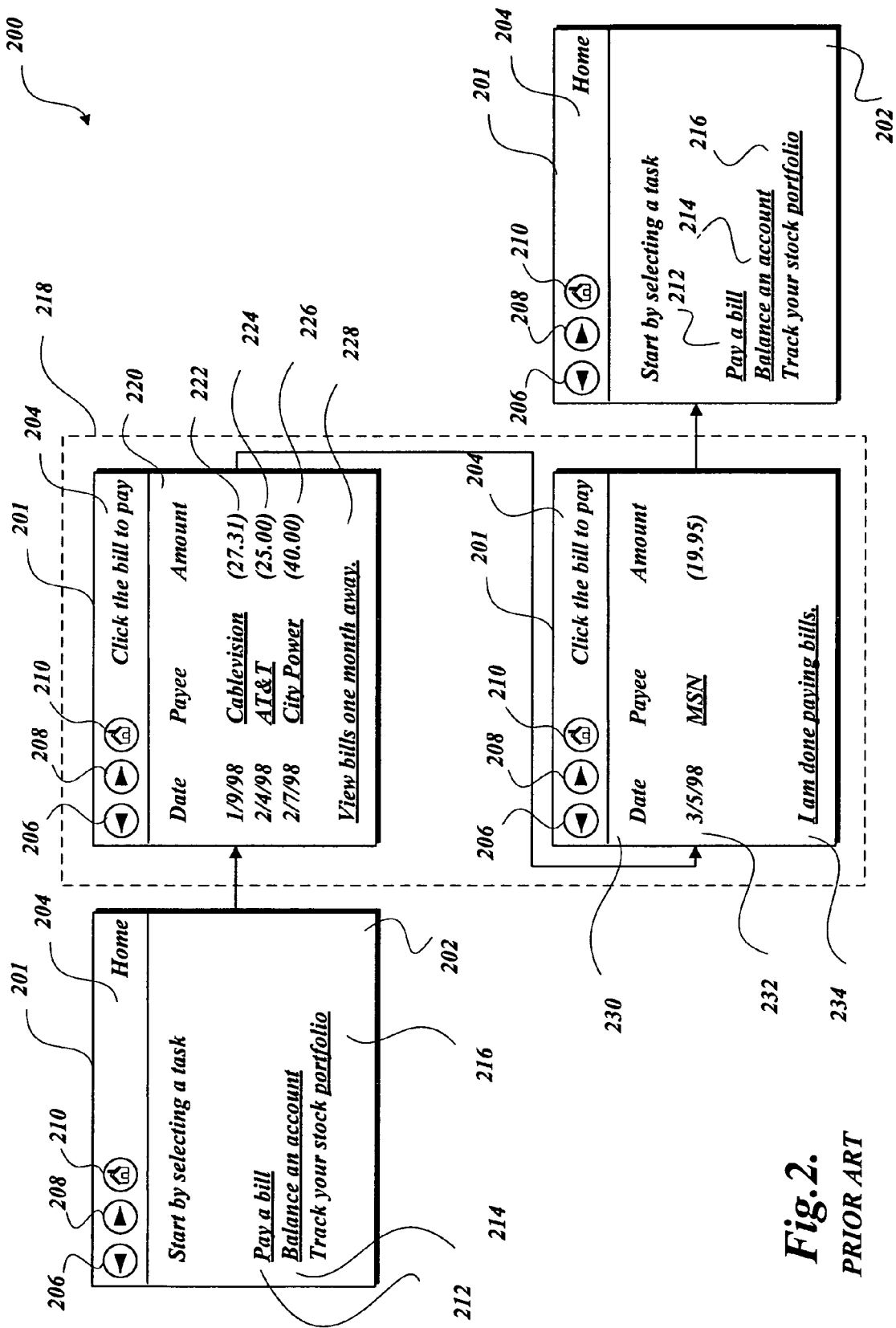
FIG. 2 is a block diagram illustrating pages and a process of a prior art Web-style application, such as Money 2000.

The frame 506 includes a user interface 508. The user interface 508 of the frame 506 includes a title bar 501, a set of navigational buttons of which only a back button 507 is shown, and a region 509 where the user interface page 504 of the page function 502 is displayed. (The shared frame 201 of the Web-style application 200 shown in FIG. 2 lacks the software component of the architectural software framework 500 identified as the frame 506.) The frame 506 contains logic and a data structure that facilitates the protocol employed to invoke the page function 502 as well as the protocol employed to facilitate the returned values as a result of the performance of a task by the page function 502. The facilitate ability allows the frame 506 to mediate the communication between any page functions. As long as a page function can communicate with the frame 506, a page function should be able to communicate with other page functions via the frame.

The page function 502 is a self-contained unit of software. To use or invoke the software, a programmer (or hereafter, "user") only needs to follow the protocol. The user does not have to know the internal working and data arrangement of the page function 502. In this way, the page function 502 overcomes the tight coupling problem described above, and becomes a reusable basic programming structure that can be used within a single program, or distributed to other programs. The frame 506, as a mediator between a first page function and another page function, provides another level of decoupling. The first page function need not know the intimate detail of the other page function in order to use the services provided by the other page function. The frame 506 guarantees that a desired page function will be invoked if the invoking page function follows the established protocol provided by the architectural software framework 500.

Figure 9:
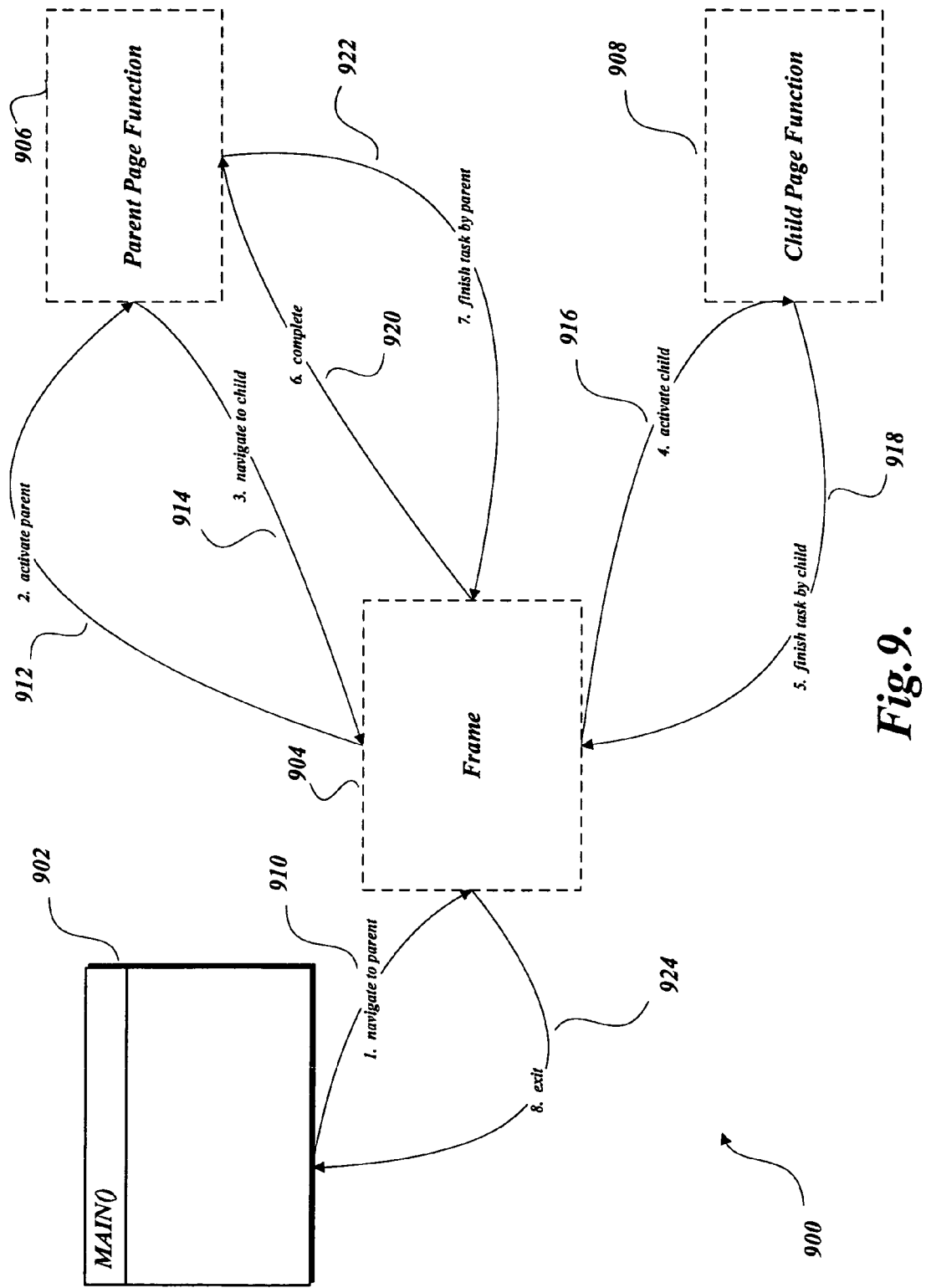
FIG. 9 is a block diagram illustrating the invocation of services of an application, a frame, a parent page function, and a child page function, according to one embodiment of the present invention.

The protocol referenced above will be better understood by reference to FIG. 9, which illustrates the use of the protocol with a Web-style application 900. The Web-style application 900 includes a starting piece of code 902, such as a main routine (e.g., main0) that can be enabled to activate a set of page functions, which comprise a parent page function 906 or a child page function 908. The user interfaces of the page functions as well as the frame are not shown in FIG. 9 in order to better focus on the flow of the protocol. When the Web-style application 900 is launched, the starting process 902 requests a frame 904 to navigate to the parent page function 906. This action is represented by a first invocation line 910. The frame 904, in response, activates the parent page function 906. This action is represented by a second invocation line 912.

Upon activation, the parent page function 906 makes one of three choices: to finish, to display its user interface page, or to create a new page function. Suppose that the parent page function 906 has been designed to automatically choose to create a new page function without displaying its user interface page. The parent page function 906 then create the child page function 908. The parent page function 906 then requests the frame 904 to navigate to the child page function 908. This action is represented by a third invocation line 914. In response, the frame 904 activates the child page function 908. This action is represented by a fourth invocation line 916.

Upon activation, the child page function 908 makes one of three choices similar to the choices presented to the parent page function 906, namely, to finish, to display its user interface page, or to create a new page function. The child page function 908 performs its task and decides to finish. This decision to finish need not be made every time a page function has performed its designated task. For example, the child page function 908 may display its user interface page instead so as to receive input from a user, but to better illustrate the flow of the protocol, the child page function 908 decides to finish after its task is performed. The child page function 908 notifies the frame 904 that it is finished. This action is represented by a fifth invocation line 918. Then the frame 904 notifies the parent page function 906 that the child page function 908 has completed its task. This action is represented by a sixth invocation line 920.

Having confirmation that the task of the child page function 908 is finished, the parent page function 906 is once again presented with three choices: to finish, to display its user interface page, or to create a new page function. The parent page function 906 decides that its task is also finished and proceeds to notify the frame 904. This action is represented by a seventh invocation line 922. Finally, the frame 904 informs the Web-style application 900 that all tasks have been performed by the page functions. This action is represented by an eighth invocation line 924. Then, the Web-style application 900 exits.

Figure 5B:
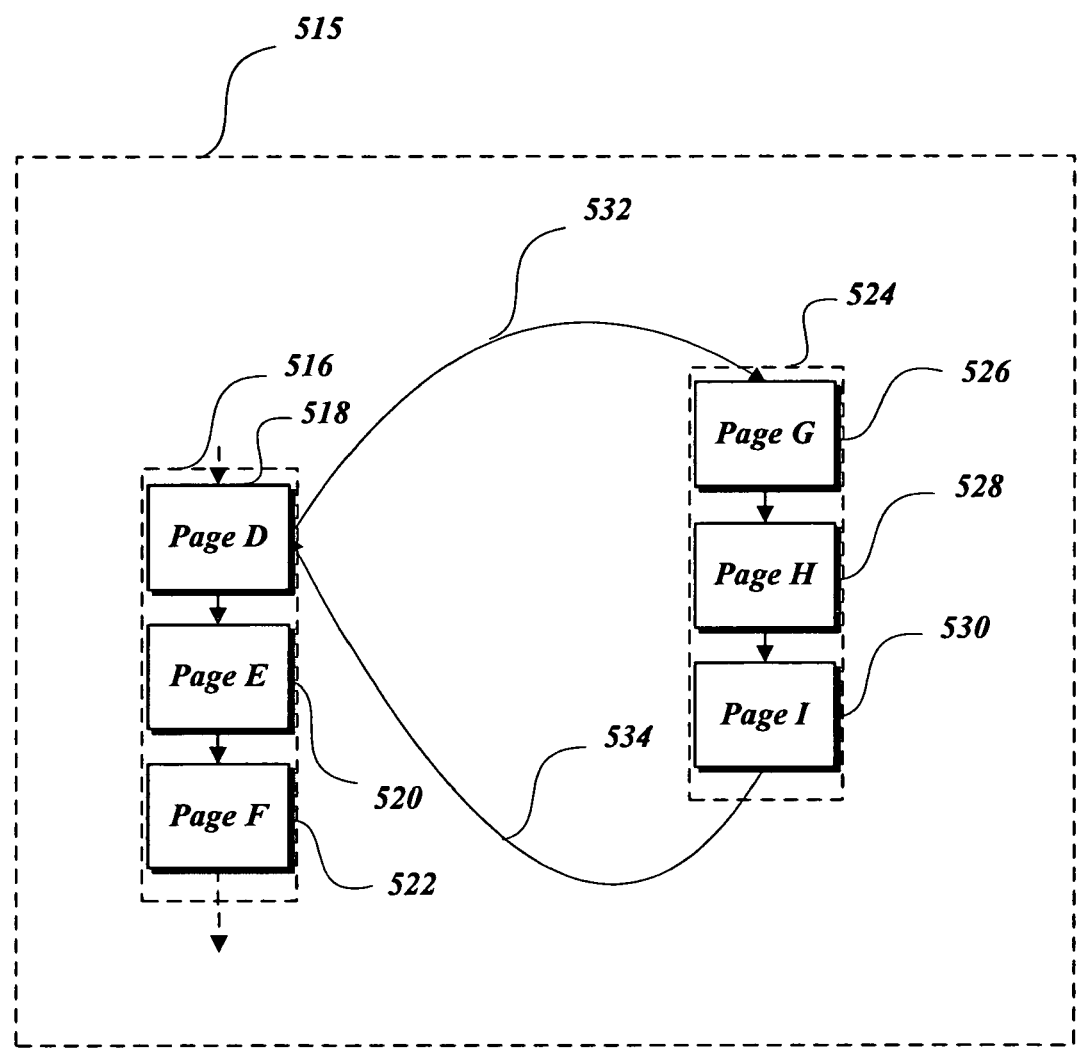
FIG. 5B is a block diagram illustrating an invocation of a collection of page functions from a page function in another collection of page functions within a Web-style application, according to one embodiment of the present invention.

FIG. 5B illustrates a portion of a Web-style application 515 in block diagram form. FIG. 5B shows the ease with which page function D 518, included in one collection of page functions 516 can invoke another collection of page functions 524 by following the protocol illustrated in FIG. 9 and supplying the necessary parameters. The invocation of the other collection of page functions 524 is represented by a line 532. The frame, which is not shown in FIG. 513 for clarity purposes, mediates between page D 518 and the other collection of page functions 524. Page G 526 is the first page of the other collection of page functions 524, and, thus, is the page to which a user is brought when page D 518 invokes the collection of page functions 524. In a conventional manner, the user can navigate from page G 526 to the next page, page H 528, of the other collection of page functions 524, and finally to the last page I 530 as the task performed by the collection of page functions 524 is completed. When this task is completed, the user is returned to page D 518, along with one or more returned values associated with the performance of the task. This return is represented by a line 534. After returning to page D 518, the user may navigate to the next page, page E 520, of the first collection of page functions 516, and then to the final page F 522 as the task or tasks associated with the Web-style application 515 are completed. The decoupling between the first collection of page functions 516 and the other collection of page functions 524, allows each of these collections 516, 524, to be used in other parts of the Web-style application 515.

Figure 5C:
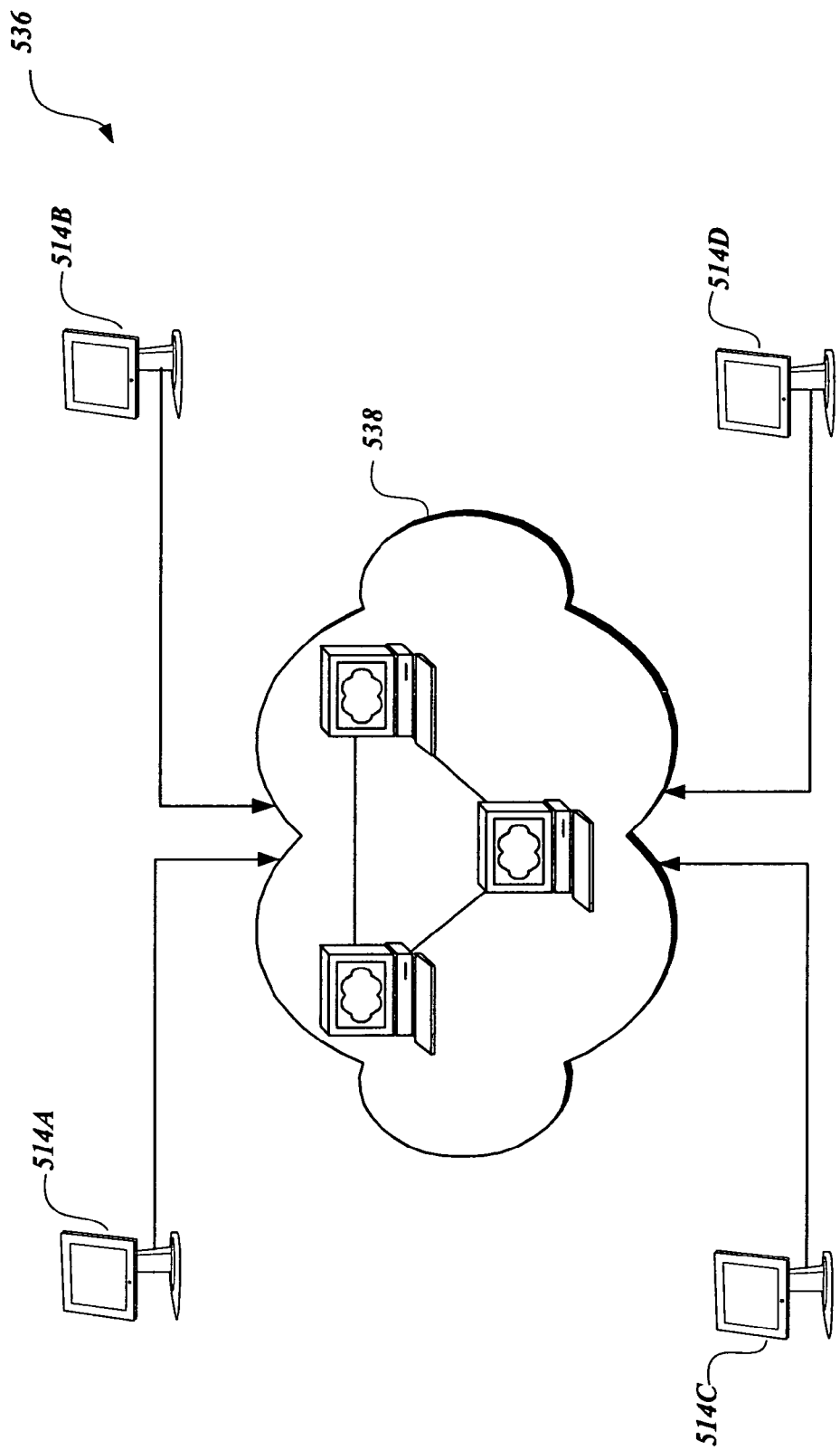
FIG. 5C is a pictorial diagram illustrating a system, which comprises a number of computing devices communicating via the Web, and particularly, the ability of one page function on one computing device to invoke another page function on another computing device across the Web, according to one embodiment of the present invention.

FIG. 5C is a pictorial diagram showing a number of computing devices 514A-514D connected together via a network, such as the Internet 538. Each computing device 514A-514D may contain a Web-style application that includes one or more page functions. The architectural software framework 500 provided by the present invention allows a page function of a Web-style application located on any of the computing devices 514A-514D, to invoke a page function of a Web-style application located on any of the other computing devices 514A-514D. Page functions are not tightly coupled to each other or to a specific database, as in the prior art, and thus, each page function can be reused and recombined. Page functions allow Web-style applications to be more Web-like in that a user can access any page functions, regardless of whether it is in an application on the same computer or on a computer half way around the world, at the press of a key, a click of a mouse, or an utterance of a user.

Figure 6A:
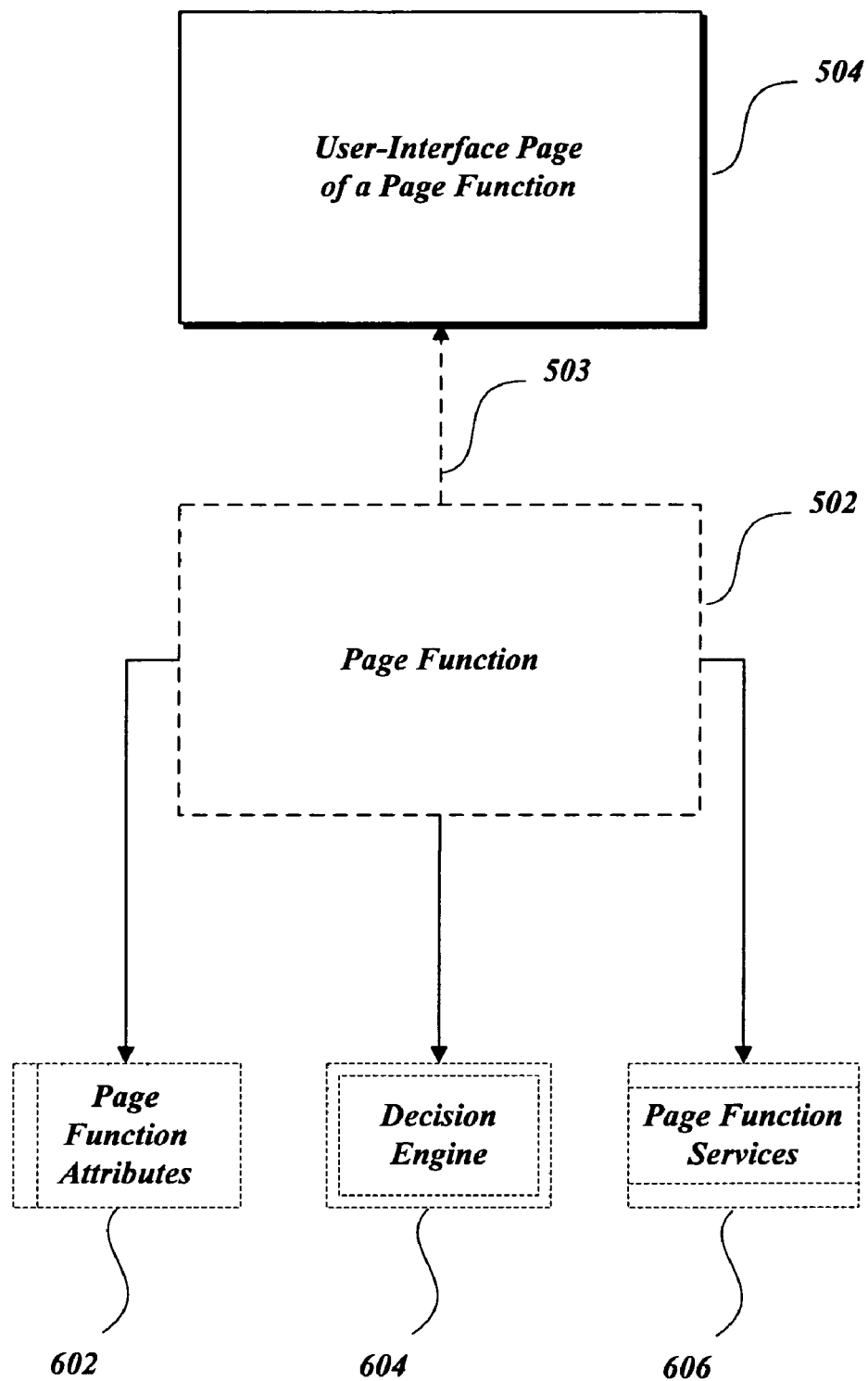
FIG. 6A is a block diagram illustrating various elements of a page function, namely a set of page function attributes, a set of page function services, a user interface page of the page function, and a decision engine, according to one embodiment of the present invention.

FIG. 6A illustrates in greater detail the page function 502 of the architectural software framework 500. As discussed before, the page function 502 may include a binding 503 that binds the page function 502 to the user interface page 504. The page function 502 has an associate user interface if binding 503 binds the page function 502 to the user interface page 504. If the page function 502 is not be bound to a user interface page. The page function has no associated used interface page. The purpose of the page function 502 determines if the page function has an associated user interface page. The page function 502 can be viewed as a generic template of the architectural software framework, a class as the term is used in the sense of object-oriented programming, or an abstract data structure or data type, or any other suitable descriptions that essentially define a blueprint from which other page functions may be produced and modified for performing a specified task.

Figure 6B:
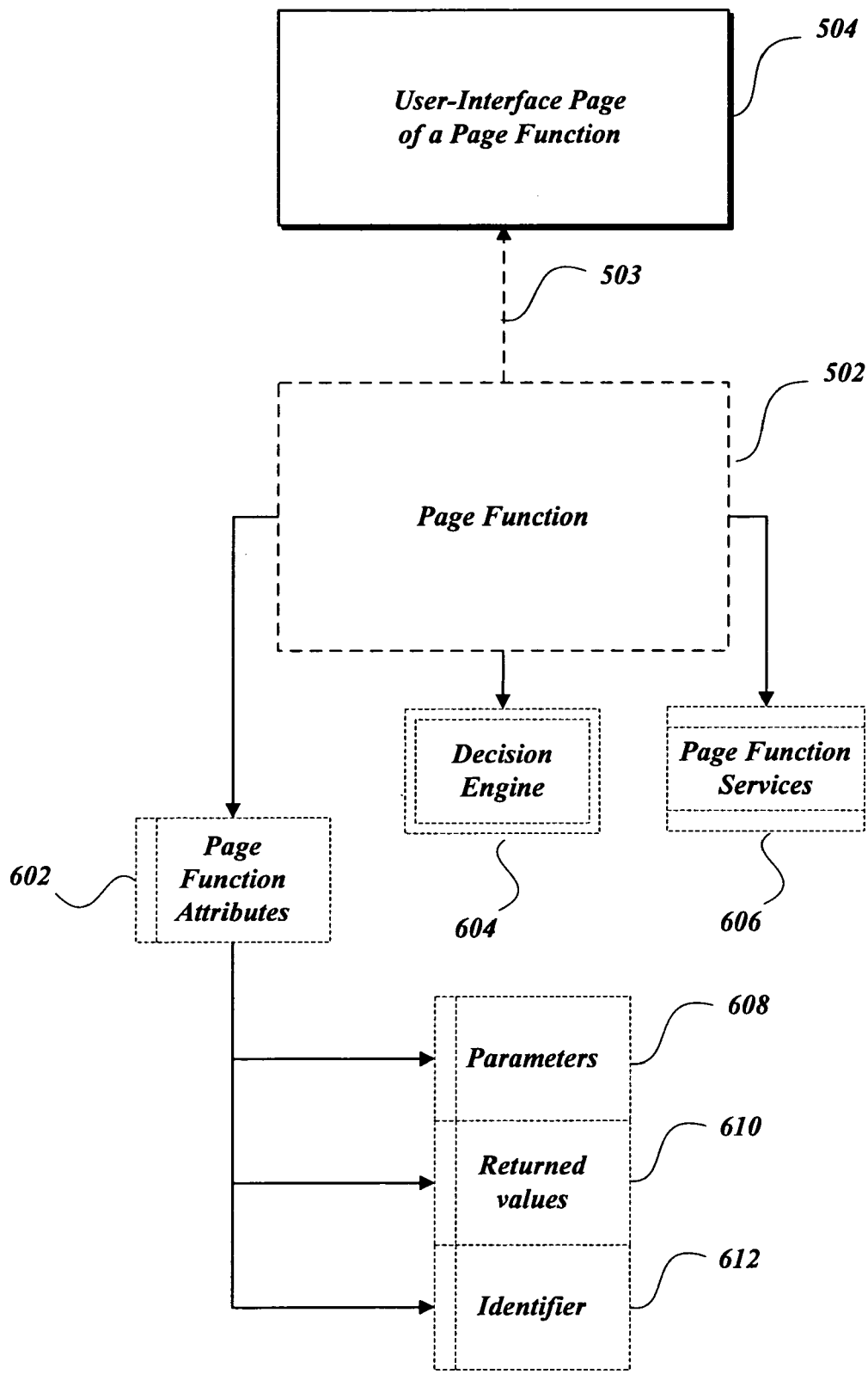
FIG. 6B is a block diagram illustrating in greater detail the set of page function attributes of a page function, according to one embodiment of the present invention.
Figure 6C:
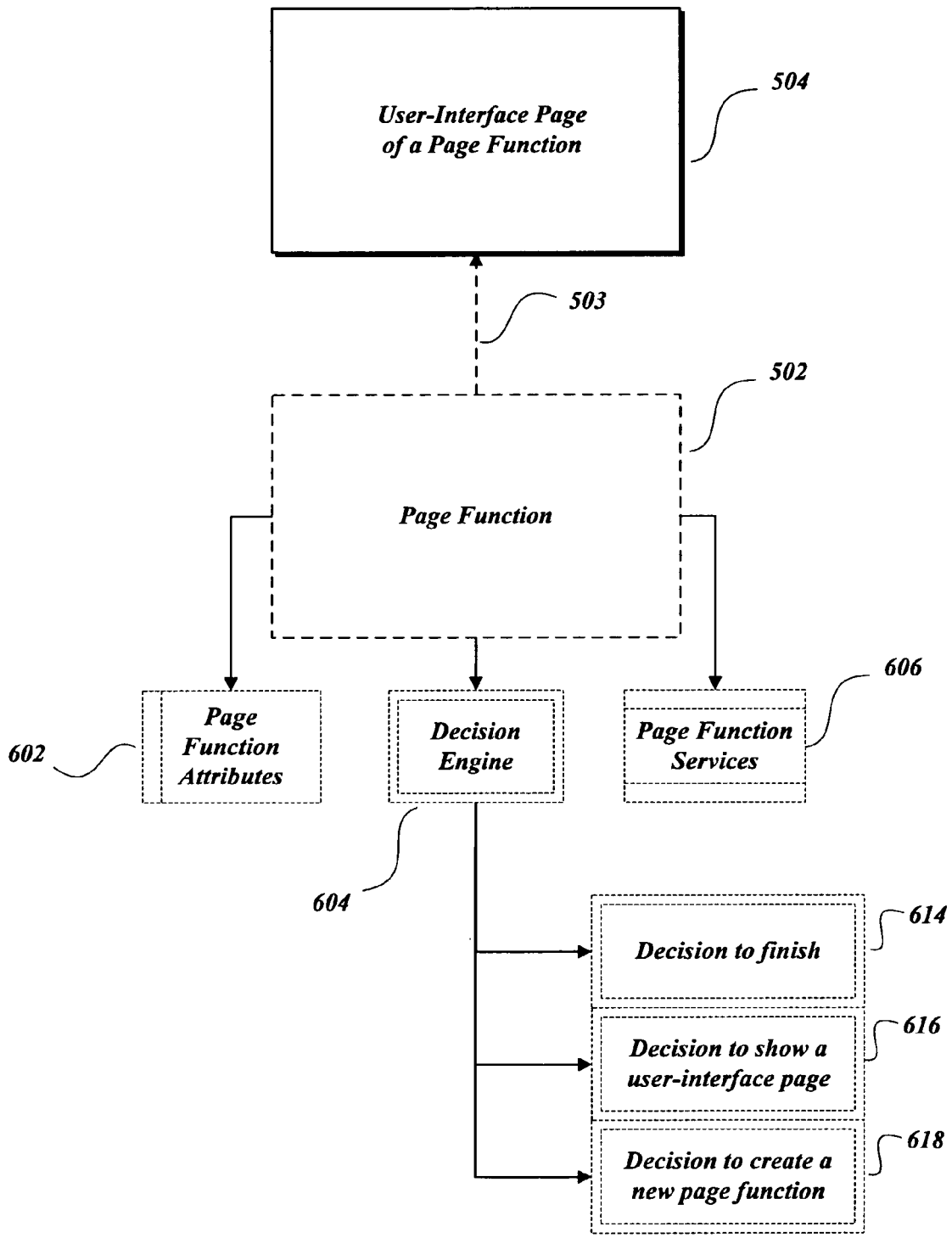
FIG. 6C is a block diagram illustrating in greater detail the various decisions selectable from the decision engine of a page function, according to one embodiment of the present invention.
Figure 6D:
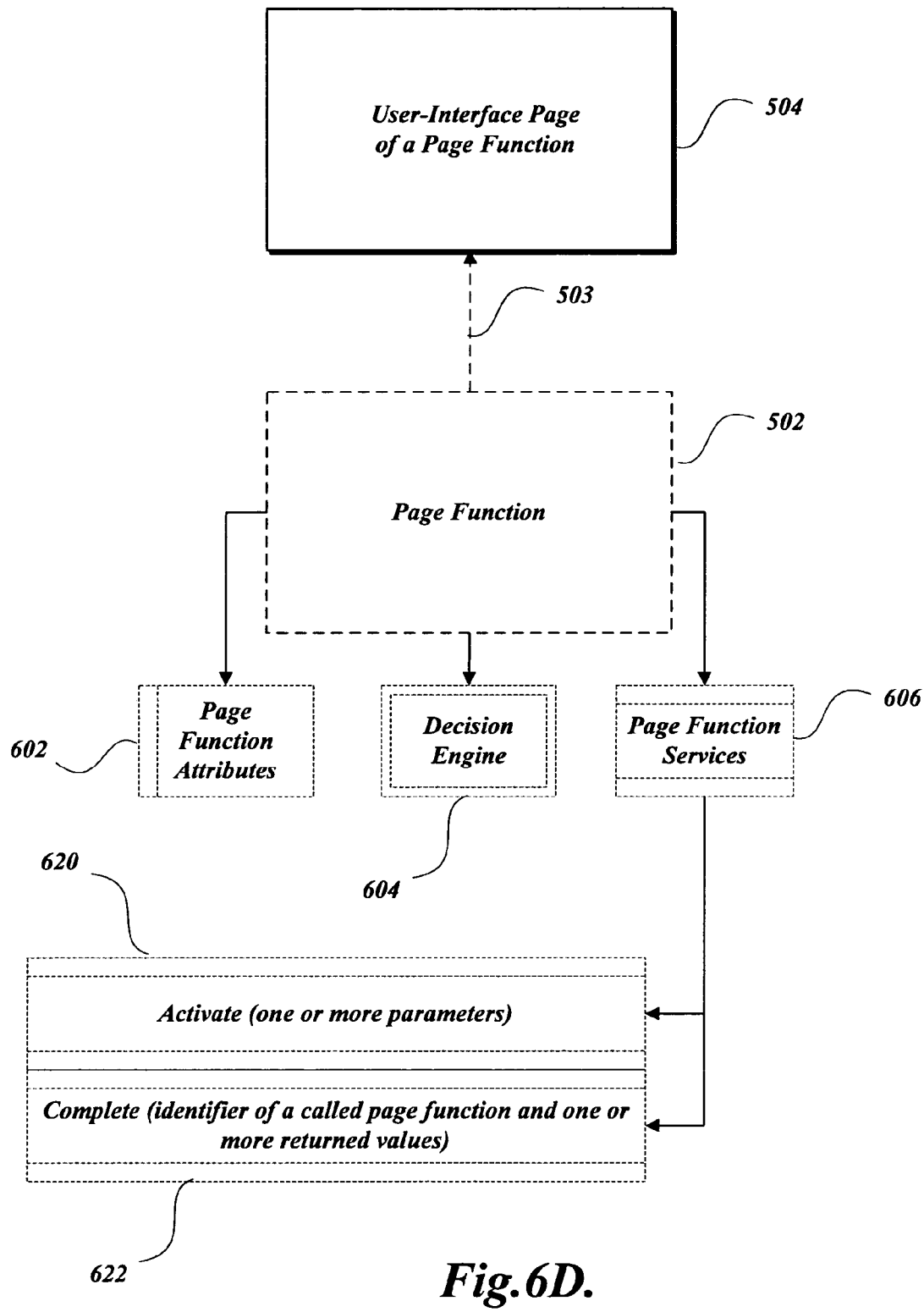
FIG. 6D is a block diagram illustrating in greater detail the set of page function services of a page function, according to one embodiment of the present invention.

As shown in FIG. 6A, the page function 502 includes a set of page function attributes 602, which are properties or data fields in which data is stored and accessed in the performance of a task. The page function 502 also includes a decision engine 604 that defines the behavior of the page function 502. Additionally the page function 502 includes a set of page function services 606. The set of page function services 606 are used to invoke the page function 502 and notify the page function 502 when another page function (not shown) has performed a desired task. FIGS. 6B-6D illustrate the set of page function attributes 602, the decision engine 604, and the set of page function services 606 in greater detail.

As shown in FIG. 6B, the set of page function attributes 602 includes one or more parameters 608, one or more return values 610, and an identifier 612. The one or more parameters 608 are exposed so that information may be provided externally to the page function 502 for it to perform a certain task. These parameters 608 are generic and can be modified to accommodate the type of information needed for the page function 502 to perform its designated task. When the page function 502 is invoked, these parameters 608 should be filled out with information of the correct data type.

As described above and discussed more fully below, the page function 502 may invoke another page function to perform another task. When that task is finished, the result of the task performed by the other page function is returned to the page function 502 via one or more returned values 610. As shown in FIG. 6B, the returned values 610 are also a part of the set of page function attributes 602. Like the parameters 608, the return values 610 are publicly exposed.

The page function 502 also has a hidden or private set of page function attributes (not shown). The hidden attributes need not be known externally for the page function 502 to perform its task. The use of exposed and hidden attributes overcomes the tight coupling problem described above. The parameters 608 and the return value 610 require minimal coupling. Minimal coupling is required because the page function 502 has to communicate with the outside world for it to perform its task. The parameters 608 allow the page function 502 to receive information and the return values 610 allow the page function 502 to receive results from other page functions.

The set of the page function attributes 602 also include an identifier 612 that uniquely distinguishes the page function 502 from other page functions. More specifically, if the page function 502 were a class in the sense of object-oriented methodology, each instance of the page function 502 can have an identifier value stored in the identifier 612 that is different from an identifier value of another instance of the page function 502. This identifier 612 is used in the architectural software framework 500 to track page functions as Well as to identify relationships between page functions, as illustrated in FIGS. 8A-8E and described more fully below. In one embodiment, these relationships are established at runtime according to what page functions are called as an application executes.

FIG. 6C illustrates the three available decisions of the decision engine 604. As noted above, these decisions are: a decision to finish 614; a decision to show a user interface page 616; and a decision to create a new page function 618. As will be readily appreciated from the foregoing description, the page function 502 may call another page function, and that page function may call another page function, and so on infinitely (limited only by the effective memory of a computing device). The decision to finish 614 of the decision engine 604 allows an invoked page function to indicate that it has performed its task and the invocation to be resolved. Thus, the decision to finish 614 instructs the frame 506 to bring the navigational flow of page functions back to the originating or invoking page function without the need to display a launching page, as in the prior art. The frame 506 keeps track of the calling/callee relationship between each invoked page function using a data structure, such as a tree or other suitable structures (discussed more fully below). The decision to finish 614 allows the invoked page function to indicate that it is finished and returns to the invoking page function with the return values 610 produced by the performed task. The lack of a need for displaying a launching page allows the page function 502 to overcome the problem discussed above with reference to FIG. 3A.

As previously described, the page function 502 may be bound to a user interface page 504 via a binding 503. In a conventional manner, the user interface page 504 receives input events from the user, and the user interface page communicates the input events to the page function 502 via any suitable means, such as an event queue. As also previously described, the page function 502 may not have an associated user interface, and in such a case, no binding 503 exists, or the binding 503 is bound to nothing. Even if the page function 502 is bound to the user interface page 504, the presentation of the user interface page 504 can be controlled by the decision to show a user interface page 616 of the decision engine 604. This control allows the page function 502 to hide its user interface page 504 if desired. Hiding a user interface page permits the seamless joining to other page functions, which is not possible in the prior art as discussed above with reference to FIG. 3A.

The page function 502 may invoke another page function by executing the decision to create a new page function 618. When a new page function is created, the page function 502 may furnish parameters to the newly created page function, or the furnishing of parameters can be delayed until the frame 506 navigates to the newly created page function (discussed below).

The decision engine 604 defines the core behavior of the page function 502. The decision engine 604 allows invoked page functions to naturally return to the originator page function. The decision engine also allows the user interface of the page function 502 to be selectively displayed. Thus, the decision engine 604 guarantees a core behavior that allows for the expansion of page functions into many different applications, while allowing to the page functions in different applications to interface with each other.

The set of page function services 606 is illustrated in FIG. 6D and described next. An activate service 620 is used to activate the page function 502. More specifically, the page function 502 is invoked by furnishing one or more parameters to the page function 502 and invoking the activate service 620. Although the parameters may be provided along with the invocation of the activate service 620, this is not required because these parameters 608 are exposed. Because the parameters 608 are exposed, the parameters can be directly accessed. Because the parameters can be directly accessed, the parameters do not have to be supplied when the activate service 620 is invoked. For example, when an invoking function (not shown) invokes the page function 502, the invoking function may supply the parameters 608 along with the invocation of the activate service 620. Or, the invoking function may directly access each parameter of the set of parameters 608 and insert the appropriate information into the parameter.

A complete service 622, when it is invoked, notifies the page function 502 that a task performed by another page function (not shown) is finished. When the complete service 622 is invoked, the identifier of a page function called or invoked to perform the required task is furnished. One or more return values 610 associated with the performed task are also furnished when the complete service 622 is invoked. Receipt of the complete service 622 lets the page function 502 know that one of its invoked page functions is finished, and that the navigational flow has returned to the page function 502.

Both the activate service 620 and the complete service 622 execute one of the three decisions associated with the decision engine 604 and discussed above with reference to FIG. 6C. The three decisions allow the page function 502: to quit (decision to finish 614); to present and receive information from the user by displaying the user interface page 504 (decision to show a user interface page 616); or to invoke another page function (decision 618 to create a new page function). The latter decision may be made because, for example, the page function 502 lacks the functionality that is possessed by the other page function. In any event, one of the three decisions is made when the page function 502 is activated and when returning from the performance of a task by an invoked page function.

Figure 6E:
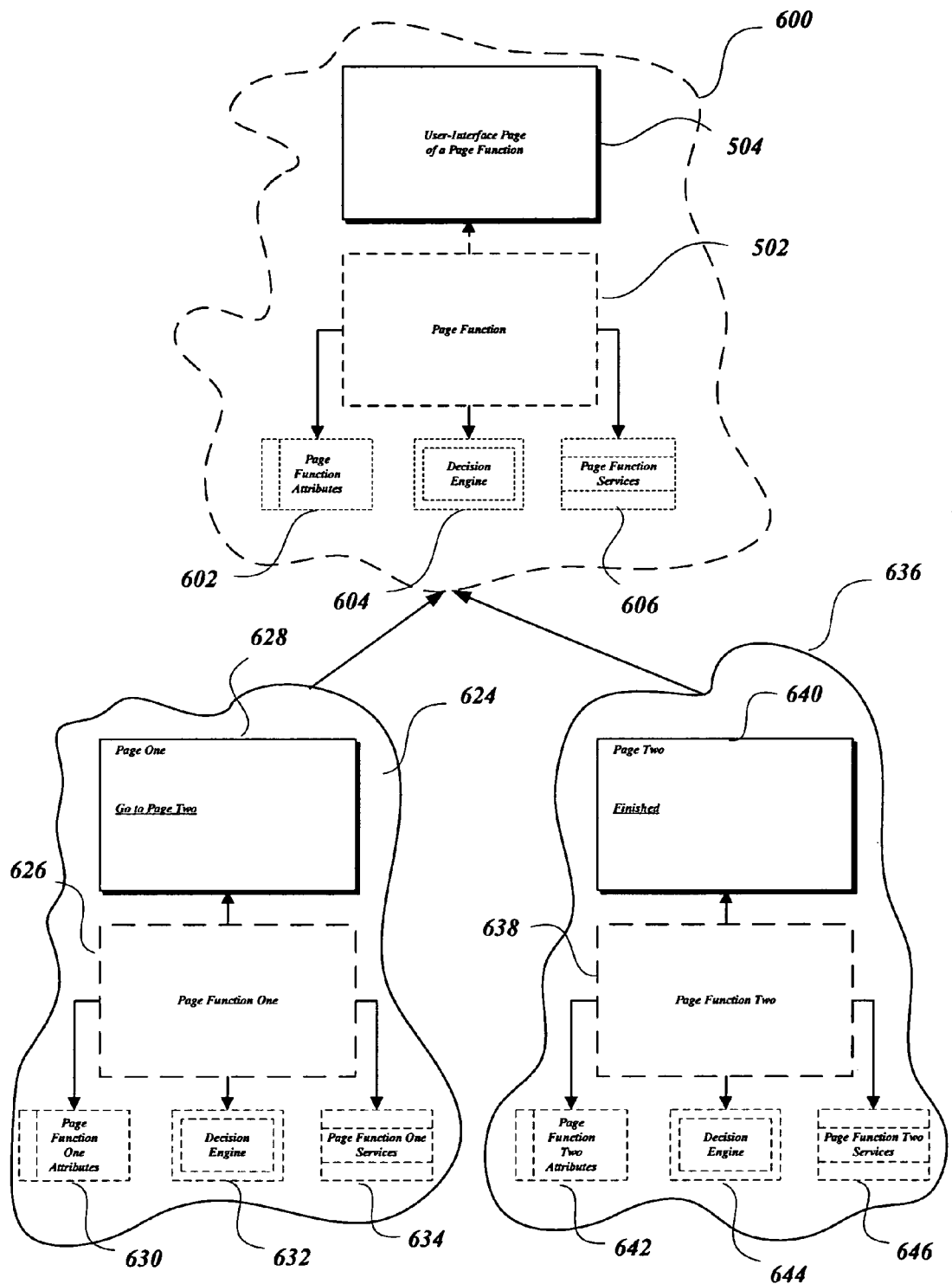
FIG. 6E is a pictorial, block diagram showing a piece of the architectural software framework associated with a page function as an abstract data type, and two page functions instantiated from the architectural software framework, according to one embodiment of the present invention.

FIG. 6E illustrates how the page function 502 is used. As noted above, the page function can be viewed as a generic blueprint, in the context of the architectural software framework 500. A portion 600 of the architectural software framework 500 contains the previously described generic page function 502. The generic page function 502 contained in the portion 600 can be used to instantiate other page functions. This allows one skilled in the art to design a page function, depicted as page function One 626 in FIG. 6E, with the initial characteristics of the generic page function 502. The initial, acquired characteristics of page function One 626 can then be enhanced, restricted, and/or modified. One suitable technique for acquiring those characteristics of the page function 502 is via the inheritance mechanism of object-oriented programming. This technique does not limit the embodiments of the present invention, and others may be used. The enhancements, restrictions, and/or modifications may include the user interface page 628 of page function One 626. For example, the user interface page 628 may be changed to include a title, such as, "Page One," to identify the location of the page in a sequence. Alternatively, the title may identify the purpose of the page function. Additionally, the user interface page 628 may include one or more hyperlinks, such as a hyperlink titled "Go To Page Two." If this hyperlink is selected, the architectural software framework 500 will transfer the user to a user interface page 640 associated with another page function (discussed below). The page function One 626 can modify the page function attributes 602 of the generic page function 502 to form a set of page function One attributes 630. The page function One 626 includes a decision engine 632 that includes at least the three decisions defined by the decision engine 604 of the generic page function 502, namely, a decision to finish, a decision to show a user interface page, and a decision to create a new page function. The page function One 626 also includes a set of page function One services 634. At a minimum, the page function One services 634 include the activate services 620 and the complete service 622 of the set of page function services 606 of the page function 502. However, the parameters to the activate services 620, and the complete service 622 may be modified.

FIG. 6E illustrates that, like the page function One 626, a second page function, depicted as page function Two 638, that inherits the characteristics of the generic page function 502 can be acquired from the generic page function 502. A user interface page 640 of page function Two 638 is displayed to a user when the hyperlink "Go to Page Two" of the user interface page 628 of page function One 626 is selected. More specifically, when the hyperlink "Go to Page Two" is selected, the decision engine 623 of page function One 626 invokes page function Two 638, which becomes active. That is, when page function Two 638 receives the activate service message, the decision engine of page function Two 638 causes the user interface page 640 to be displayed. The user interface page 640 of page function Two 638 may include a title, such as, "Page Two," and a hyperlink, such as a hyperlink titled "Finished". When the hyperlink "Finished" is selected by the user, the decision engine 644 of page function Two 638 executes the finish decision. Execution of the finish decision invokes the complete service of page function One 626. This causes the page function One 626 to be notified that page function Two 638 has accomplished its task.

As with other page functions, page function Two 638 includes a set of page function Two attributes 642, a decision engine 644, and a set of page function Two services 646. Like page function One 626, the set of page function Two attributes 642 include the parameters required for page function Two 638 to perform and the ability to return values from other page functions invoked by page function Two 638. The three core decisions of the decision engine 644 of page function Two 638 are inherited from the decision engine 604 of the generic page function 502. The set of page function Two services 646 includes at a minimum both the activate services 620 and the complete service 622 of the page function 502.

Figure 7A:
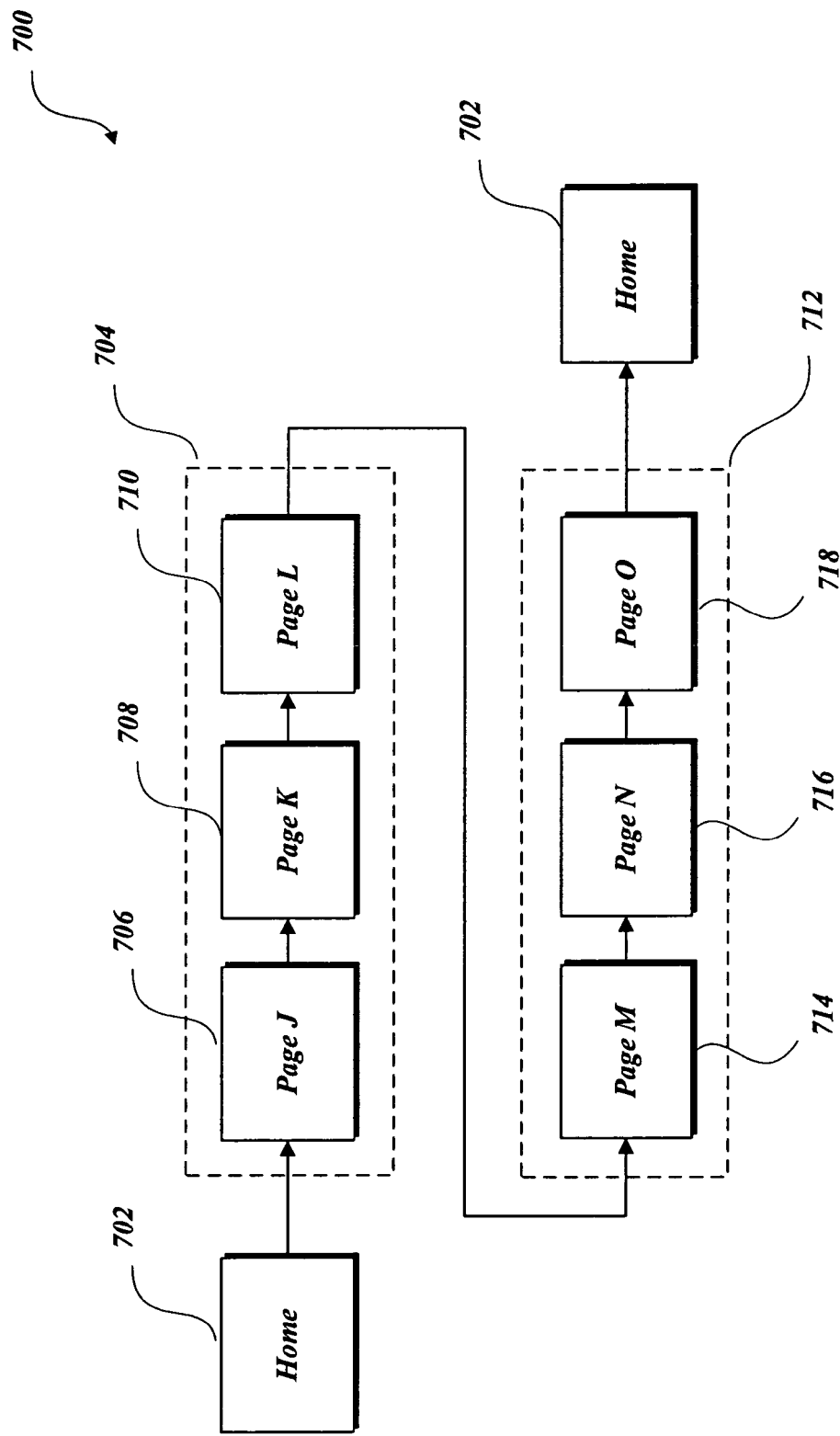
FIG. 7A is a block diagram illustrating the forming of a new functionality by the joining of the functionality of one collection of page functions and the functionality of another collection of page functions without the constraints posed by the interposition of launching pages, according to one embodiment of the present invention.

FIG. 7A illustrates a portion of the user interface pages of page functions comprising a Web-style application 700. The page functions themselves are not shown here for brevity purposes. FIG. 7A shows the seamless integration or joining of a first collection of page functions 704 and a second collection of page functions 712. From a Home page 702, a user navigates to the first page, identified as page J 706, of the first collection of page functions 704. Two additional pages, identified as page K 708 and page L 710, complete the first collection of page functions 704. Unlike the prior art, a user can navigate through the second collection of page functions 712 by navigating directly from page L 710 to the first page, identified as page M 714, of the second collection of page functions 712. As noted the navigation is direct, i.e., without having the Home page function 702 interposed between the two collections of page functions 704, 712, and without page function 704 needing to know how to call page function 712 (described below).

The second collection of page functions 712 also includes two additional page functions, identified as page N 716 and page O 718. When the user exits from page O 718, which is the last page function of the second collection of page functions 712, the user is automatically navigated to the Home page 702, which launched the first collection of page functions 704.

Figure 3A:
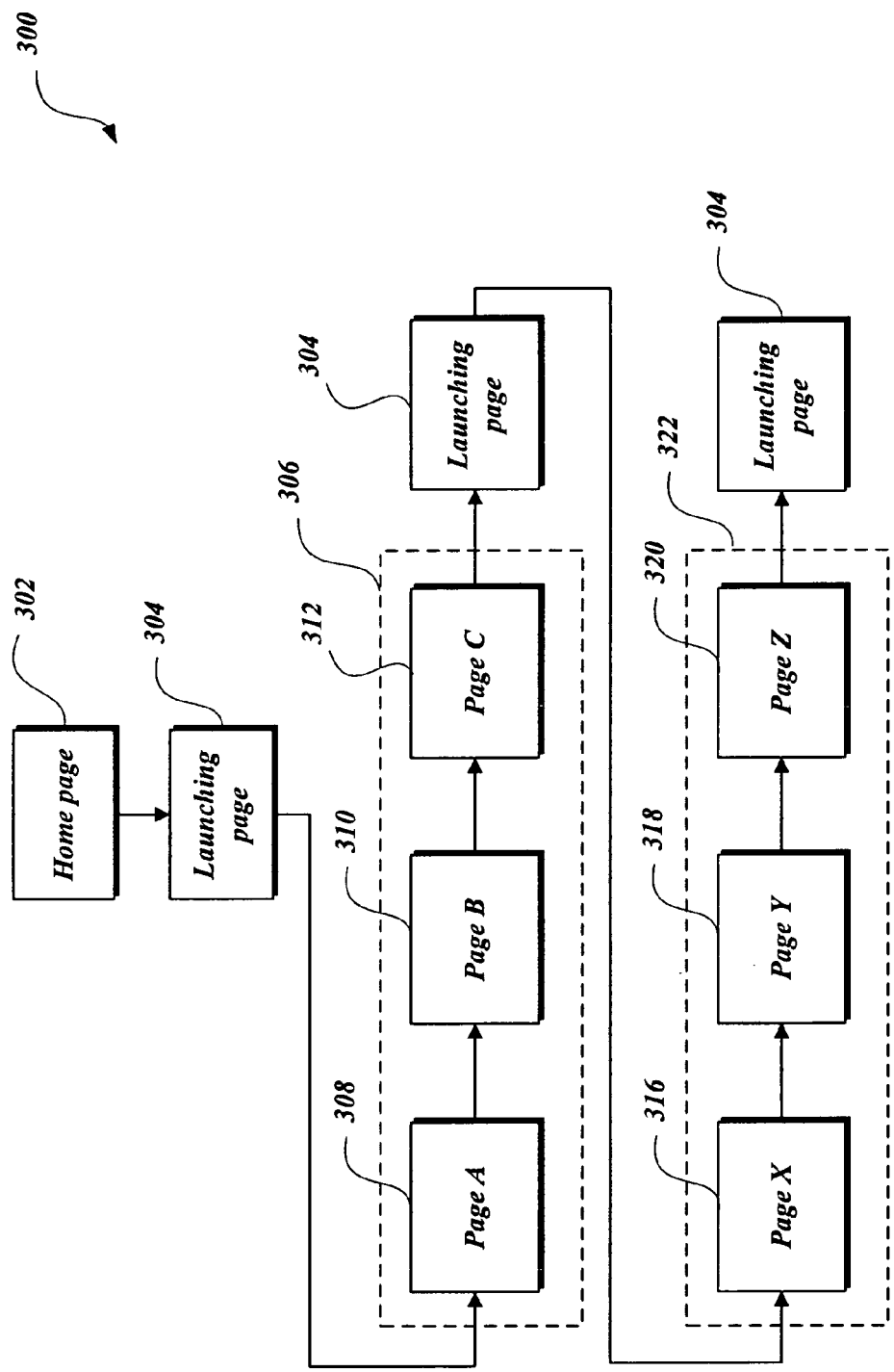
FIG. 3A is a block diagram illustrating pages and processes of a prior art Web-style application, and particularly, the problem associated with interposing a launching page between two processes.
Figure 3B:
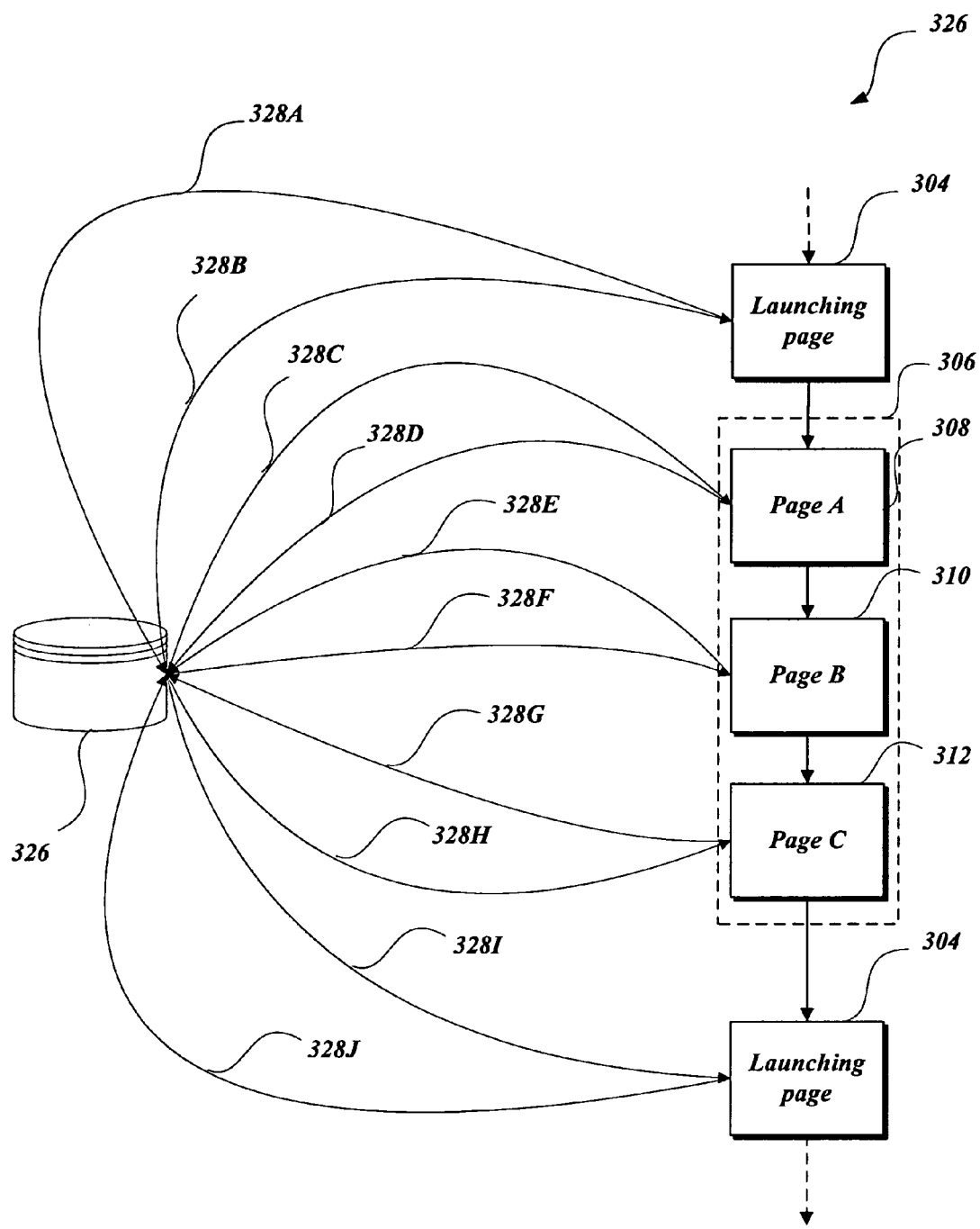
FIG. 3B is a block diagram illustrating the prior art problem associated with a tight database coupling between a launching page and the pages of a process.
Figure 3C:
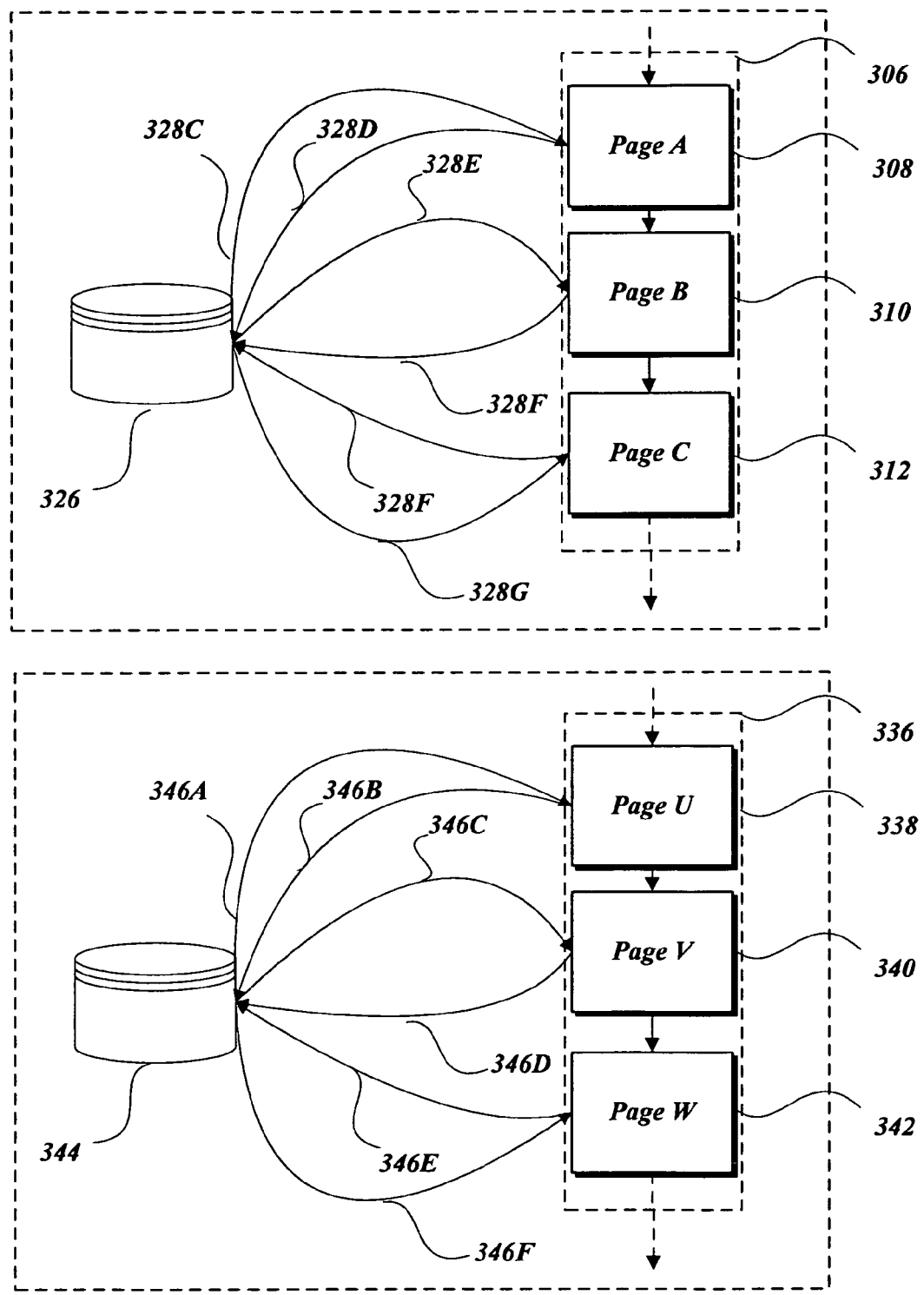
FIG. 3C is a block diagram illustrating the tight coupling between a process and a database of one Web-style application and the tight coupling of a process and a database of another Web-style application, and particularly, the prior art problem of integrating the two processes of the two Web-style applications without posing a security risk.
Figure 3D:
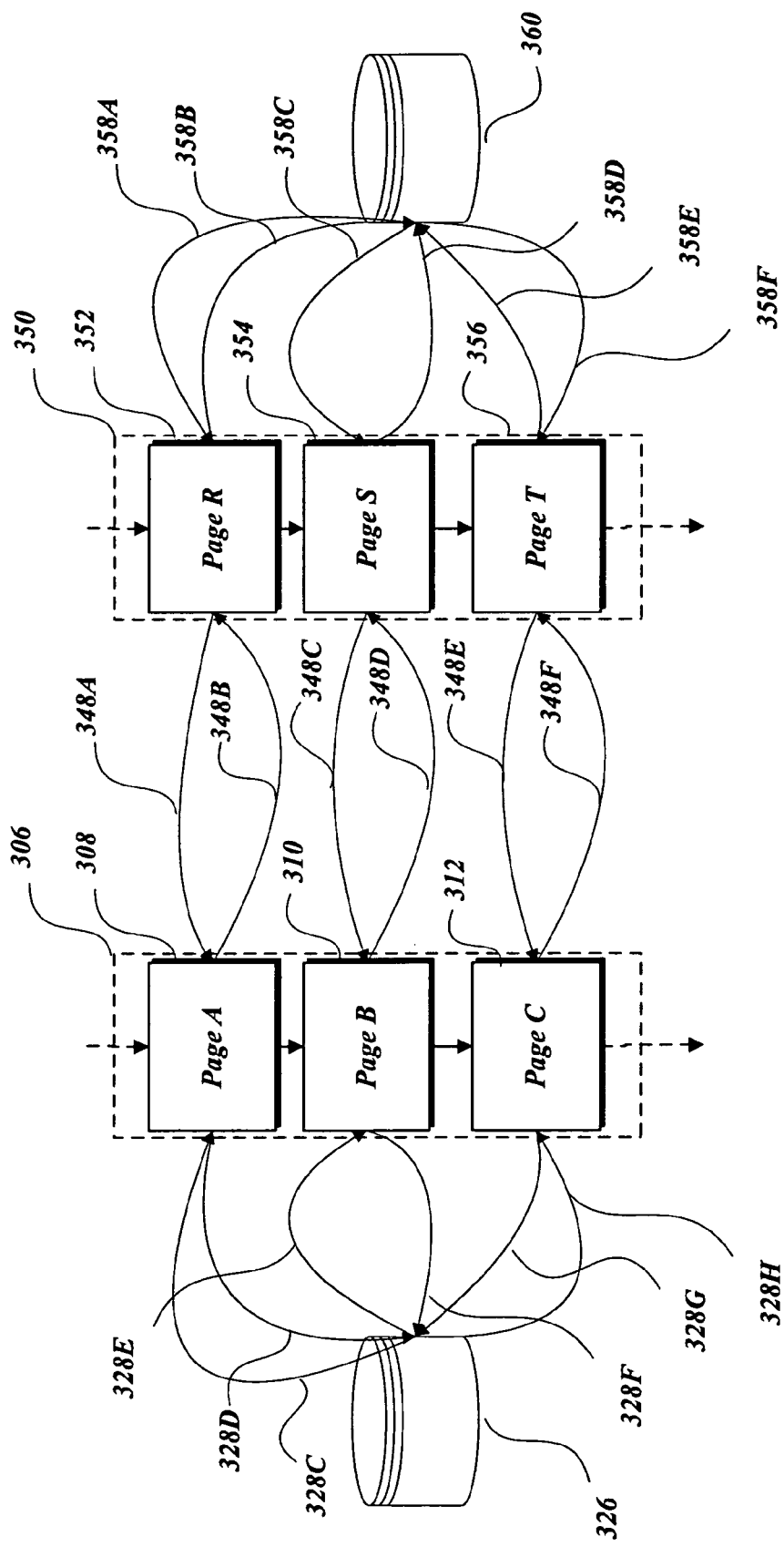
FIG. 3D is a block diagram illustrating the tight coupling between a process and a database and another process and another database, and, thereby the prior art problem of inhibiting the reusability of either processes.

The Web-style application 700 shown in FIG. 7A, which uses one or more page functions, should be contrasted with the Web-style application 300, shown in FIG. 3A, which uses Web-like pages. As shown, the first collection of page functions 704 is integrated to the second collection of page functions 712 without an interposing launching page. This difference increases the flexibility of the architectural framework 500 because it allows different functionalities of page functions to be combined together. This allows page functions to expand beyond the separate designs.

Figure 7B:
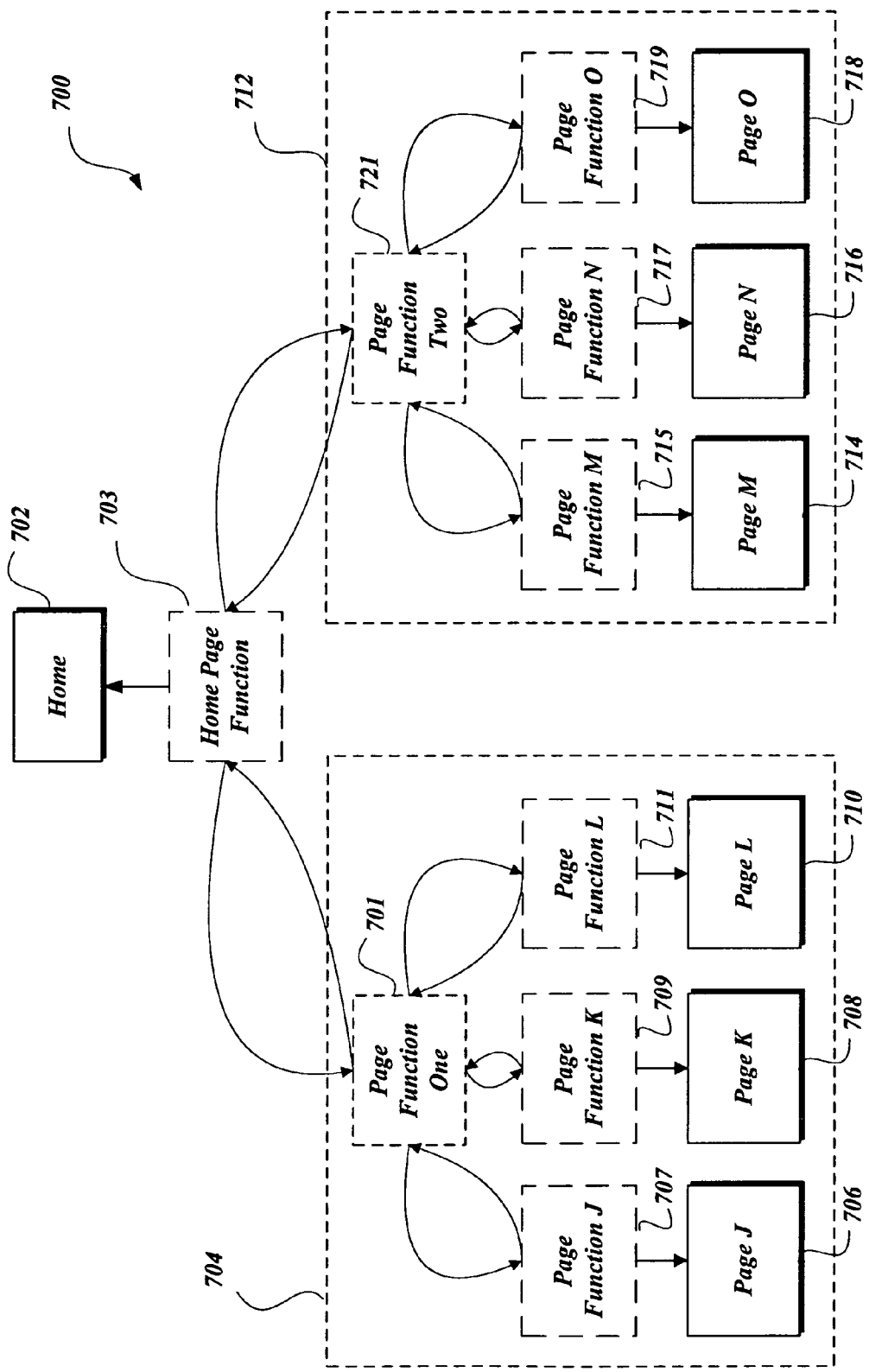
FIG. 7B is a block diagram illustrating one implementation of the forming of a new functionality from the functionalities of two collections of page functions illustrated in FIG. 7A, according to one embodiment of the present invention.

FIG. 7B illustrates one implementation of the integration of the first collection of page functions 704 and a second collection of page functions 712, shown in FIG. 7A, according to one embodiment of the present invention. Home page function 703 is shown as bound to its associated user interface page 702. When a user clicks on a hyperlink displayed on the user interface page 702 that is associated with the task of the first collection of page functions 704, a user interface event is created. In response to the user interface event, via the binding to the user interface page 702, the Home page function 703 executes a decision to create a page function, identified as page function One 701, and to activate page function One 701. Page function One 701, upon activation, creates and navigates to a page function identified as page function J 707. Page function J 707 executes a decision to display its user interface page 706. When the user accomplishes the task associated with the user interface page 706 associated with page function J 707, page function J 707 executes a decision to finish and returns to page function One 701.

Following a sequence of creation and navigation similar to the process discussed above with respect to page function J 707, page function One 701 sequentially creates and navigates to two further additional page functions, identified as page function K 709 and page function L 711. When the user has accomplished the task associated with the user interface page 710, associated with page function L, page function L 711 navigates the process back to page function One 701. Page function One 701 returns process control to the Home page function 703. During processing of the first collection of page functions 704, only the associated user interface pages 706-710 are displayed to the user. Because the page function One 701 does not have an associated user interface page, page function One, it is invisible to the user.

After processing, control returns to the Home page function 703, the Home page function 703 executes a decision to create another page function, identified as page function Two 721, and to activate page function Two. This occurs without displaying the Home interface page 702. This results in the first collection of page functions 704 being seamlessly integrated with the second collection of page functions 712 without a user interface page 702 being interposed in between the first and second collections of page functions.

Similar to the first collection of page functions 704, page function Two 721 creates a first page function identified as page function M 715, which displays its related user interface page 714. When the task associated with page function M 715 is finished, page function Two 721 creates another page function, identified as page function N 717, which displays its related user interface page 716. When the task associated with page function N 717 is accomplished, page function Two 721 creates a further page function, designated page function O 719, which displays its related user interface page 718. For purposes of this description, page function O is the last page function. Process control returns to the Home page function 703 when the task associated with page function O 719 is finished. When this occurs, the user interface page of the Home page function 703, i.e., the Home interface page 702, is again displayed to the user as shown in FIG. 7A and discussed above.

Figure 7C:
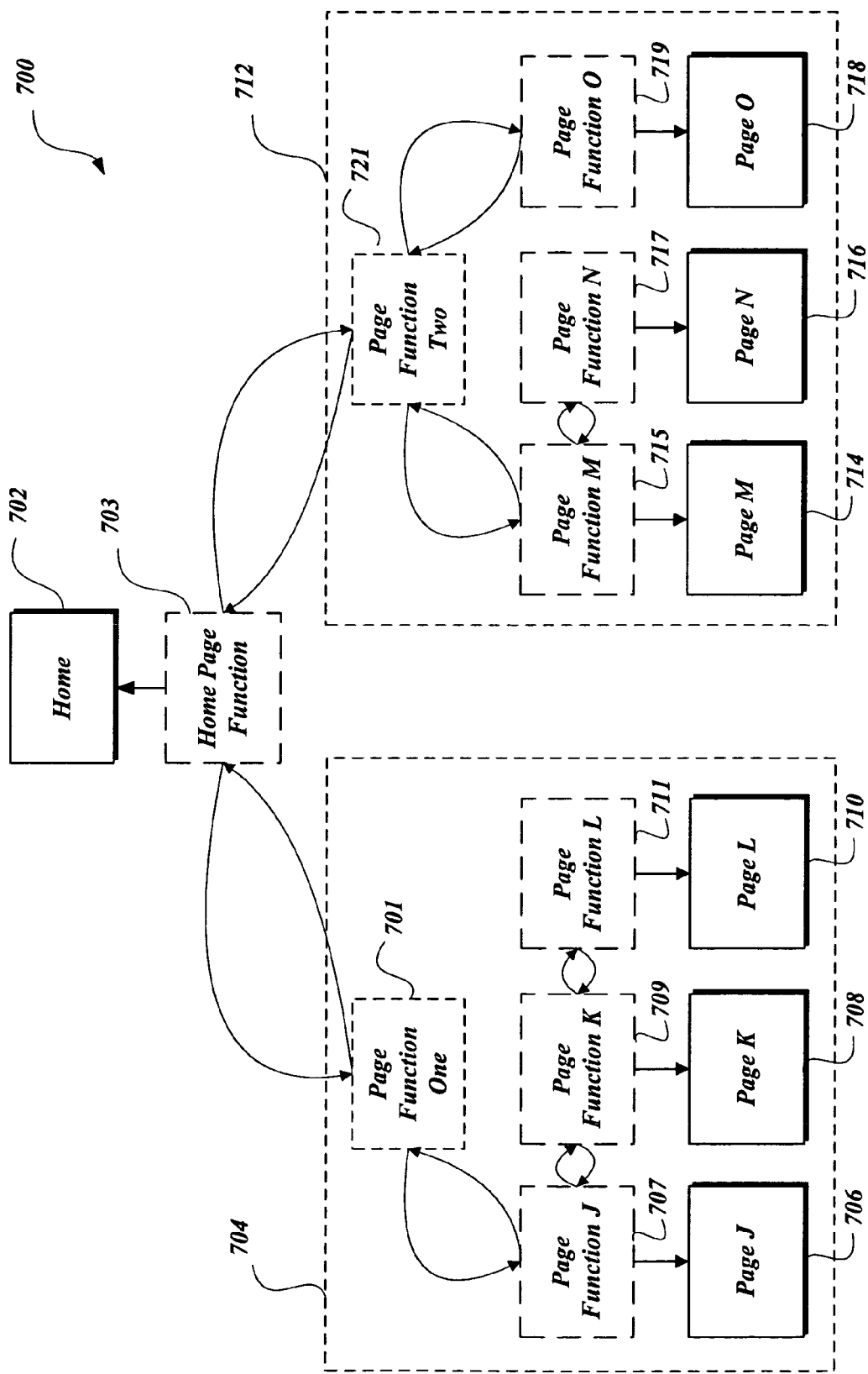
FIG. 7C is a block diagram illustrating another implementation of the forming of a new functionality from the functionalities of two collections of page functions, according to another embodiment of the present invention.

FIG. 7C illustrates another implementation of the integration of the first collection of page functions 704 to the second collection of page functions 712 shown in FIG. 7A, according to another embodiment of the present invention. Initially, the Home page function 703 displays its associated user interface page 702 so that the user can select tasks. When the task associated with the first collection of page functions 704 is selected, the Home page function 703 creates and navigates to the related page function, in this case the previously described page function One 701. As previously described, page function One 701 does not have a related user interface page. As a result, without displaying any user interface page, the page function One 701 invokes page function J 707. As a result, as also previously described, the user interface page 706 associated with page function J 707 is displayed. Process flow proceeds to page function K 709 when the task to be performed by page function J 707 is finished. However, rather than page function One 701 invoking page function K 709 as in FIG. 7B, page function J 707 invokes page function K 709. When invoked, page function K 709 displays its associated user interface page 708. When the task to be performed by page function K 709 is finished, page function L 711 is invoked. Again, rather than page function One 701 invoking page function L 711, as in FIG. 7B, page function L 711 is invoked by page function K 709. When page function L 711 is invoked, its related interface page 710 is displayed. When the task related to page function L 711 is finished, the process flows back to page function K 709, then to page function J 707, then to the page function One 701, and finally to the Home page function 703, which, as noted above, invoked the first collection of page functions 704.

The Home page function 703 next proceeds to create and navigate to page function Two 721. Again, this occurs without displaying the user interface page 702 associated with the Home page function. As with FIG. 7B, the page function Two 721 first invokes page function M 715. As a result, the user interface page 714 associated with page function M 715 is displayed. When the task associated with page function M 715 is finished, rather than returning to page function Two, page function M 715 invokes page function N 717. As a result, the user interface page 716 associated with page function N 717 is displayed. When the task associated with page function N 717 is finished via the interaction of the user with the user interface page 716, the process returns to page function M 715 and, then, to page function Two 721. Next, page function Two 721 invokes page function O 719. As a result, the user interface page 718 associated with page function O 719 is displayed. When the task associated with page function O 719 is finished, the process returns to page function Two 721 and, then, to the Home page function 703. This return results in the user interface page 702 associated with the Home page function 703 being again displayed.

The integration between the first collection of page functions 704 and the second collection of page functions 712 resulting from the process illustrated in FIG. 7B is the same as the integration resulting from the process illustrated in FIG. 7C. Identical results are possible because the Home page function 703 has the ability to withhold the presentation of its associated user interface page 702. Thus, the navigation from the last page of the first collection of page functions 704 to the first page of the second collection of page functions 712 appears to be seamless. FIG. 7B and FIG. 7C illustrate the different ways in which page functions may be linked together using this invention. In the FIG. 7B example, the user interface pages of both the first collection of page functions 704 and the second collection of page functions 712 are limited such that the user interface pages always return to either page function One 701 or page function Two 721. In the FIG. 7C example, page function One 701 is linked only to page function J 707. Page function J 707 is linked to page function K 709 and the page function K 709 is linked to page function L 711. Additionally, page function Two 721 linked to page function M 715 and to the page function O 719. Page function N 717 is linked to page function M 715. These exemplary different linking combinations indicate the variety of ways one page function can be linked to another page function.

In FIG. 7B, page functions J 707, K 709, and L 711 do not need to know the parameters/return values for each other because page function One 701 calls all three. In FIG. 7C, page function J 707 does need to know the parameters/return values for page function K 709 because page function J 707 calls page function K 709. Futhermore, in FIG. 7C, page function J 707 will need to handle the situation where page function K 709 completes (it will have to account for completion of page function K in choosing one of its three decisions).

In FIG. 7B, page function J 707 does not need to know anything about page function K.

The architectural software framework 500 allows Web-style applications having means for expansion and interfacing with other Web-style programs to be readily designed. The architectural software framework 500 also provides a reusable basic structure, for creating Web-style applications comprised of one or more linked together page functions. As discussed next with reference to FIGS. 7D-7E, because Web-style applications formed in accordance with this invention are more Web-like than the prior art, they can be linked to regular Web pages.

Figure 7D:
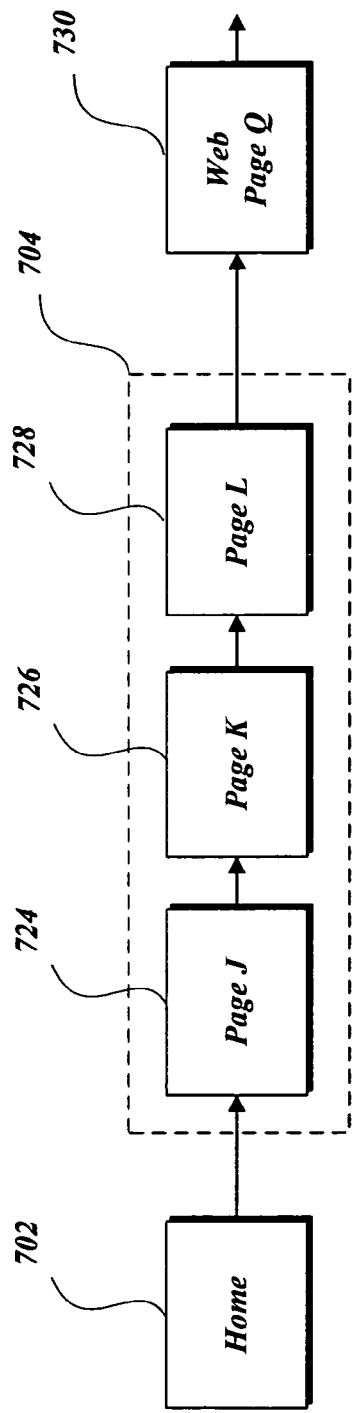
FIG. 7D is a block diagram illustrating the adaptability of the page functions to link to regular Web pages, according to one embodiment of the present invention.

FIG. 7D includes the previously described Home page function 702 and the pages associated with one of the previously described collection of page functions 704, namely, page functions J 724, K 726, and L 728, all operating within the context of the architectural software framework 500. In this example, page L 728 contains a hyperlink that allows a user to navigate to an Internet Web page, identified as a Web page Q 730. When this hyperlink is activated, the process no longer benefits from the architectural software framework 500. On the other hand, extending the architectural software framework 500 to link to regular Web pages allows page functions to be linked to regular Web pages if necessary.

Figure 7E:
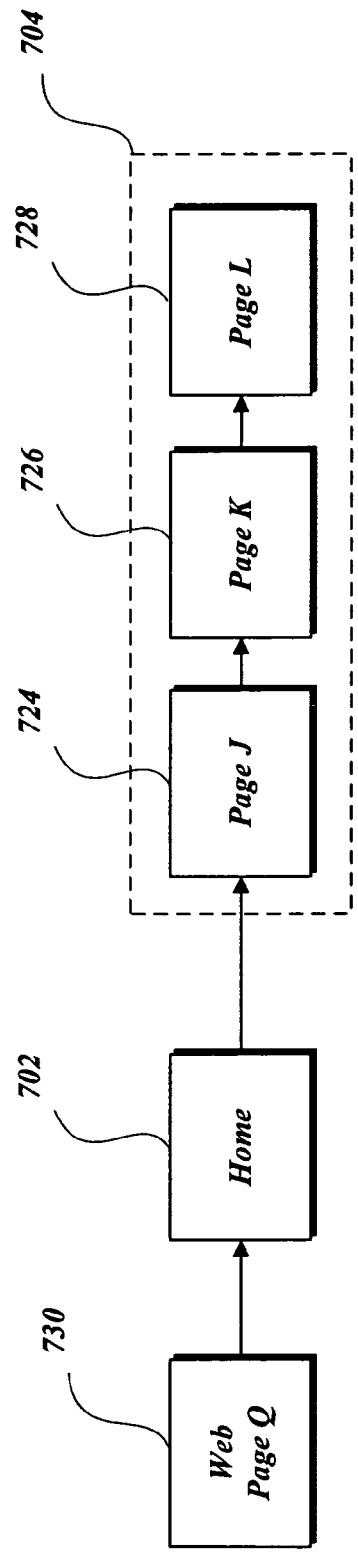
FIG. 7E is a block diagram illustrating the adaptability of the page functions to be linked from regular Web pages, according to one embodiment of the present invention.

FIG. 7E shows that an Internet Web page, identified as Web page Q 730, can be linked to enter the environment provided by the architectural software framework 500. When that occurs, a user can take advantage of the benefits provided by the architectural software framework 500. The FIGS. 7D-7E illustrations are indicative of the ability of the architectural software framework 500 to fit within the existing Internet Web page environment.

As noted above and illustrated in FIG. 5A, the architectural software framework 500 includes both the page function 502 and the frame 506. The foregoing discussion of FIGS. 6A-6E and FIGS. 7A-7D has focused on page functions and the navigation flow between page functions without discussing the frame 506. As will be better understood from the following description, the frame 506 mediates navigation from one page function to another page function.

Figure 8A:
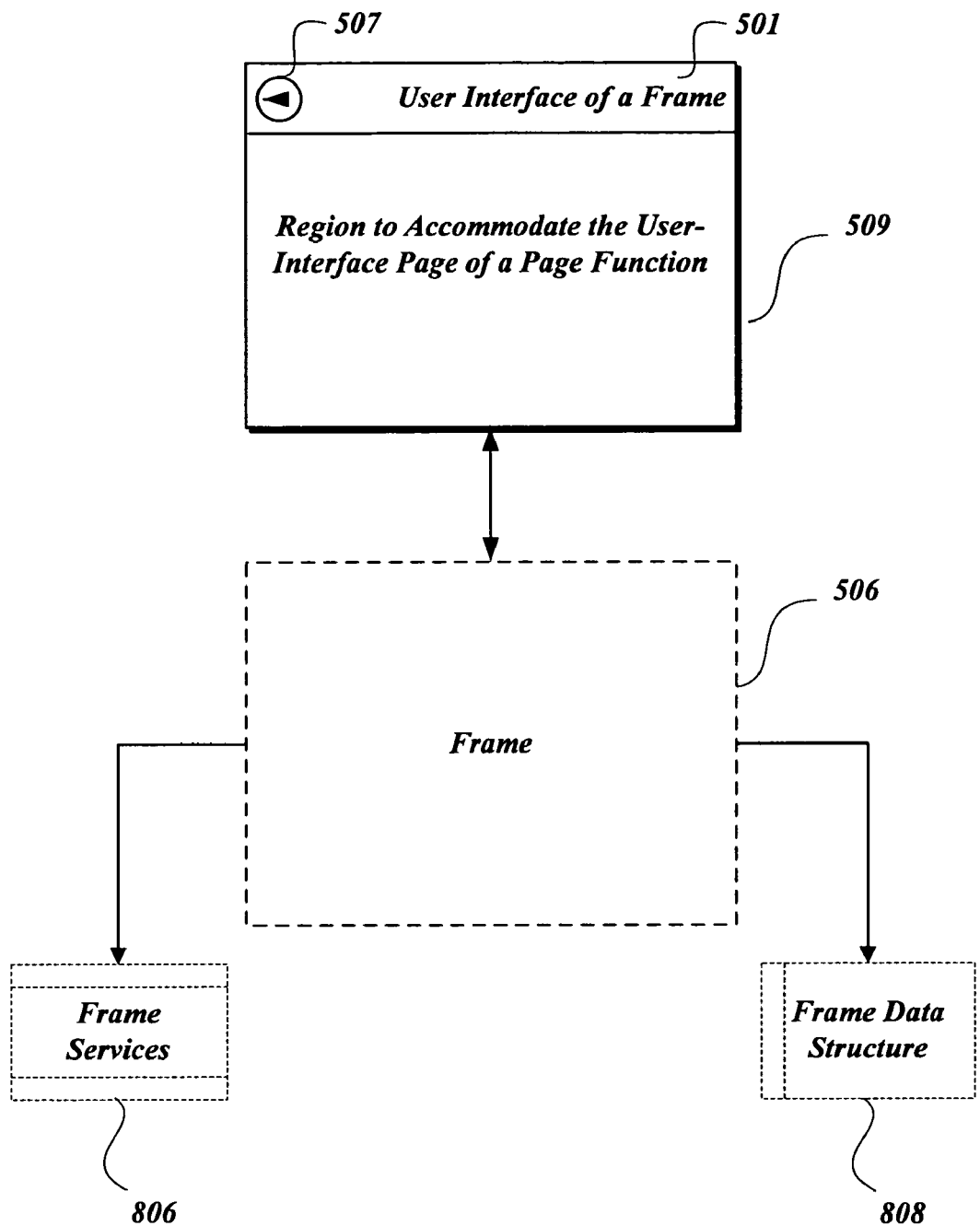
FIG. 8A is a block diagram illustrating elements of a frame, which includes a set of frame services, a frame data structure, and a user interface of the frame, according to one embodiment of the present invention.

As shown in FIG. 8A, the frame 506 employs a set of frame services 806 and a frame data structure 808 for mediating between page functions. Page functions that seek to invoke another page function use the set of frame services 806 to notify the frame 506. The frame 506 uses the frame data structure to keep track of which page function has invoked another page function.

Figure 8B:
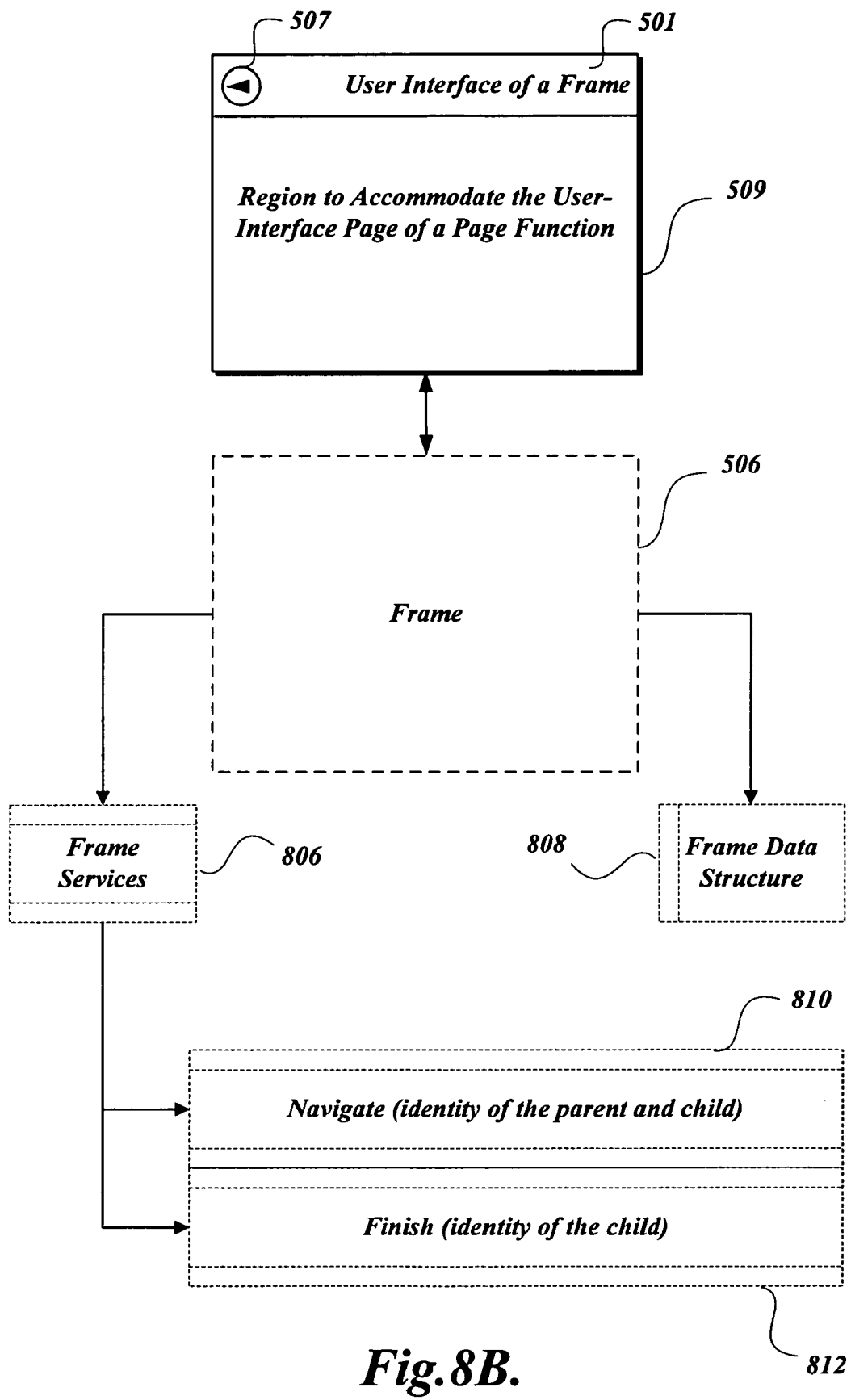
FIG. 8B is a block diagram illustrating in greater detail the set of frame services for a frame, according to one embodiment of the present invention.

FIG. 8B illustrates the set of frame services 806 of the frame 506 in greater detail. As illustrated, the set of frame services 806 include a navigate service 810. The navigate service 810 is invoked by a page function when the page function seeks to navigate to another page function. This process of invoking the navigate service 810 is a portion of the protocol by which one page function engages another page function to perform a designated task. When the invocation of the navigate service 810 is invoked, the identities of the parent page function (the invoking page function) and the child page function (the invoked page function) are provided to the frame 506. In this way, the frame 506 keeps track of the page functions that the frame 506 navigates.

The set of frame services 806 also include a finish frame service 812. The finish service 812 is invoked by the child page function when a child page function has accomplished the task requested by a parent page function. The finish service is used to notify the frame 506 when the child page function has completed its task. When the frame receives a notification that the task of a child page function is finished, the frame 506 employs the complete service of the parent page function to notify the parent page function of the completion. The finish service 812, like the navigate service 810, provides an orderly protocol that advises the frame 506 when the child page function has ended because the requested task has been performed.

Figure 8C:
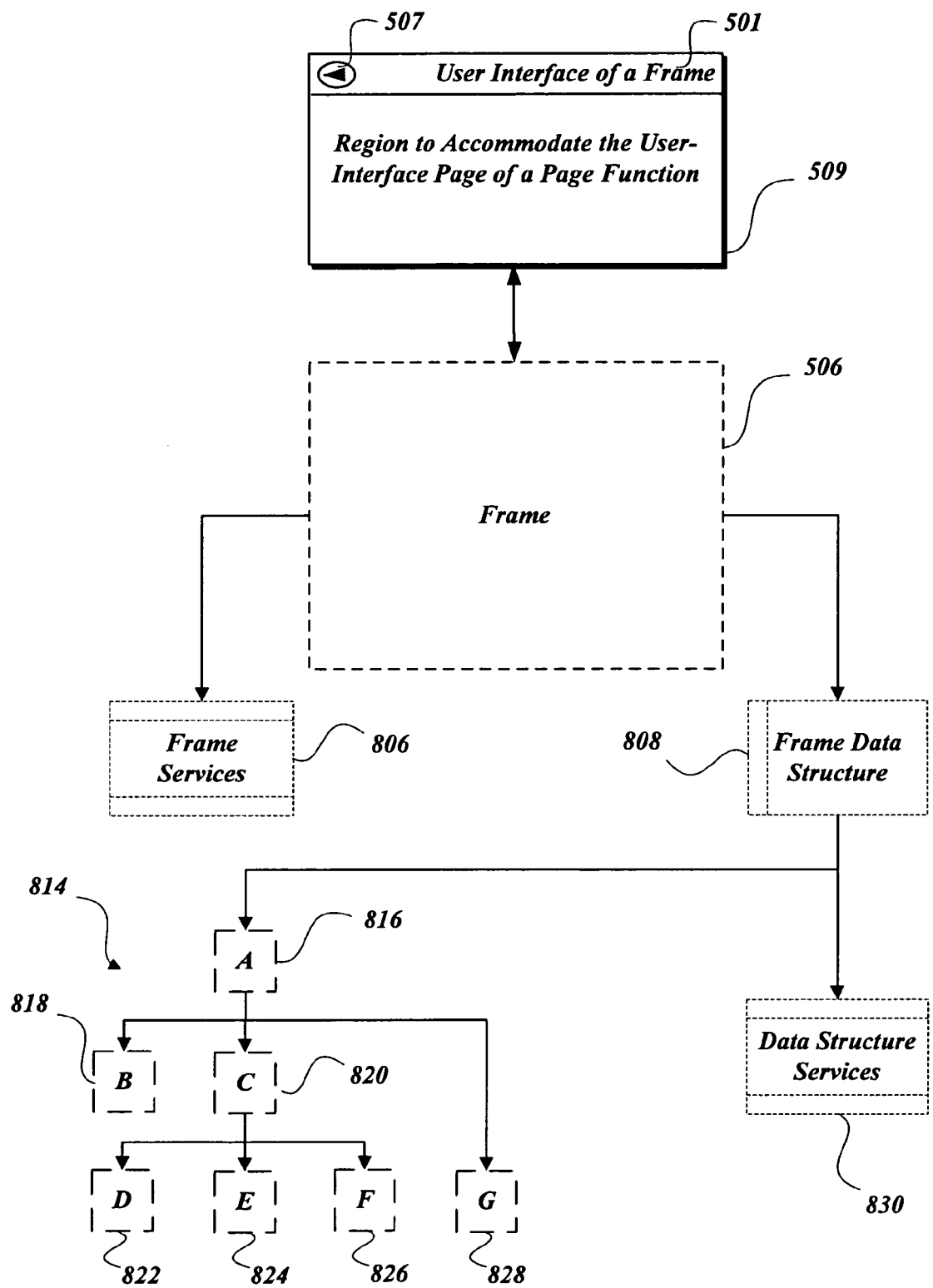
FIG. 8C is a block diagram illustrating in greater detail the frame data structure according to one embodiment of the invention.

FIG. 8C illustrates in the frame data structure 808 of the frame 506. The exemplary illustration of the frame data structure 808 includes a tree 814, which comprises a number of nodes, identified as node A 816, node B 818, node C 820, node D 822, node E 824, node F 826, and node G 828. Each of these nodes represents a page function to which the frame 506 has navigated. For example, node B 818 represents a child page function, which was invoked by a parent page function represented by node A 816.

The tree 814 provides the frame 506 with knowledge about the relationship between page functions. The tree 814 is not the history of links followed using the navigational tools, such as the back button 507, of the user interface 501 of the frame 506. Instead, the tree 814 captures each invocation of the navigate service 810 of the set of frame services 806.

Figure 8D:
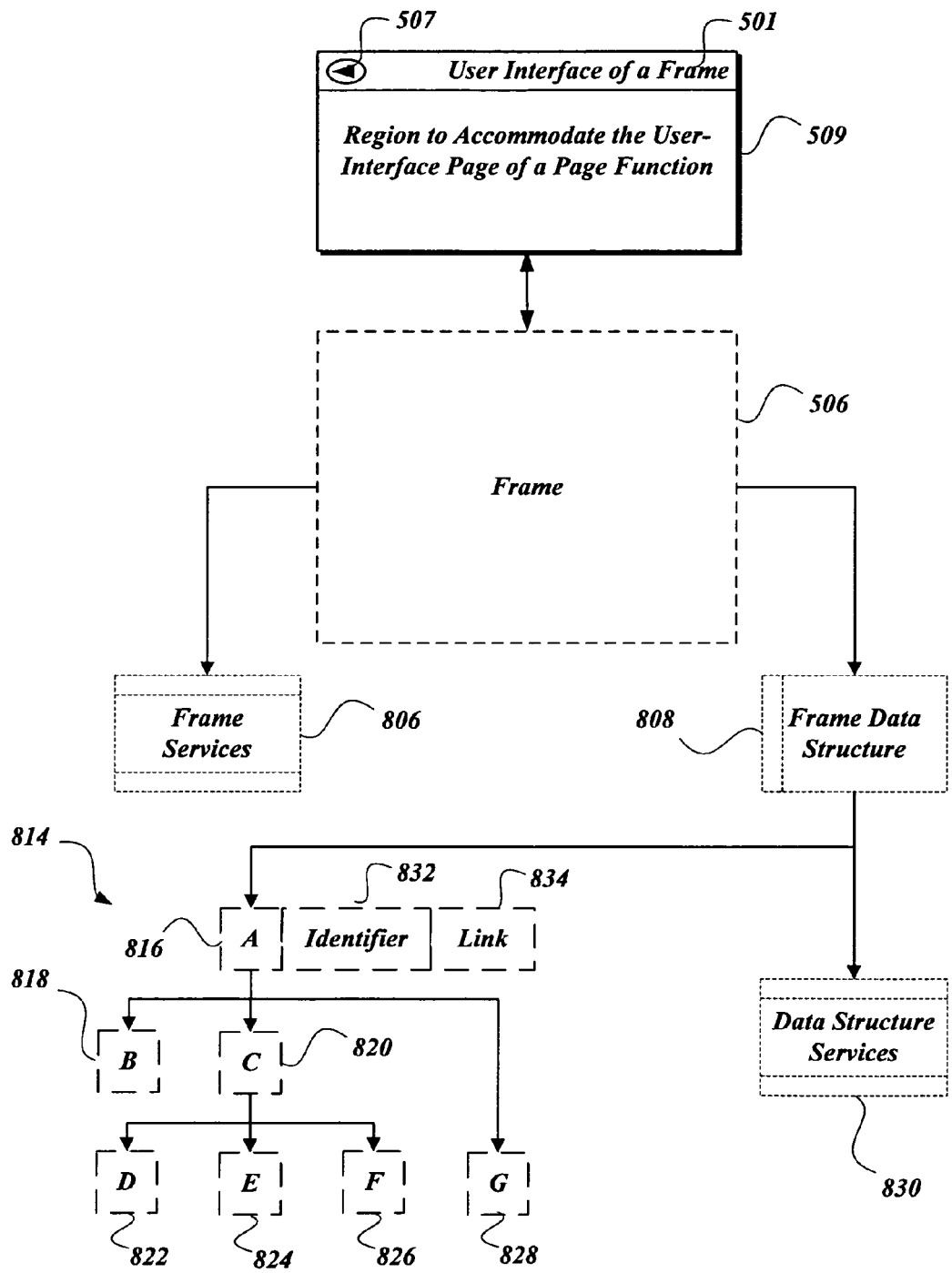
FIG. 8D is a block diagram illustrating in greater detail a node of an implementation of a frame data structure of a frame, according to one embodiment of the present invention.

FIG. 8D illustrates that each node of the tree 814 includes an identifier 832 and a link 834. For brevity purposes, the identifier 832 and the link 834 are shown in FIG. 8D to be associated with the node A 816, it being understood that each node of the tree 814 also contains an identifier and a link. The identifier 832 identifies the page function to which the frame has navigated in response to an invocation of the navigate service 810. The link 834 contains a pointer to the parent page function that requested the frame 506 to navigate to the child page function (identified by the identifier 832).

Figure 8E:
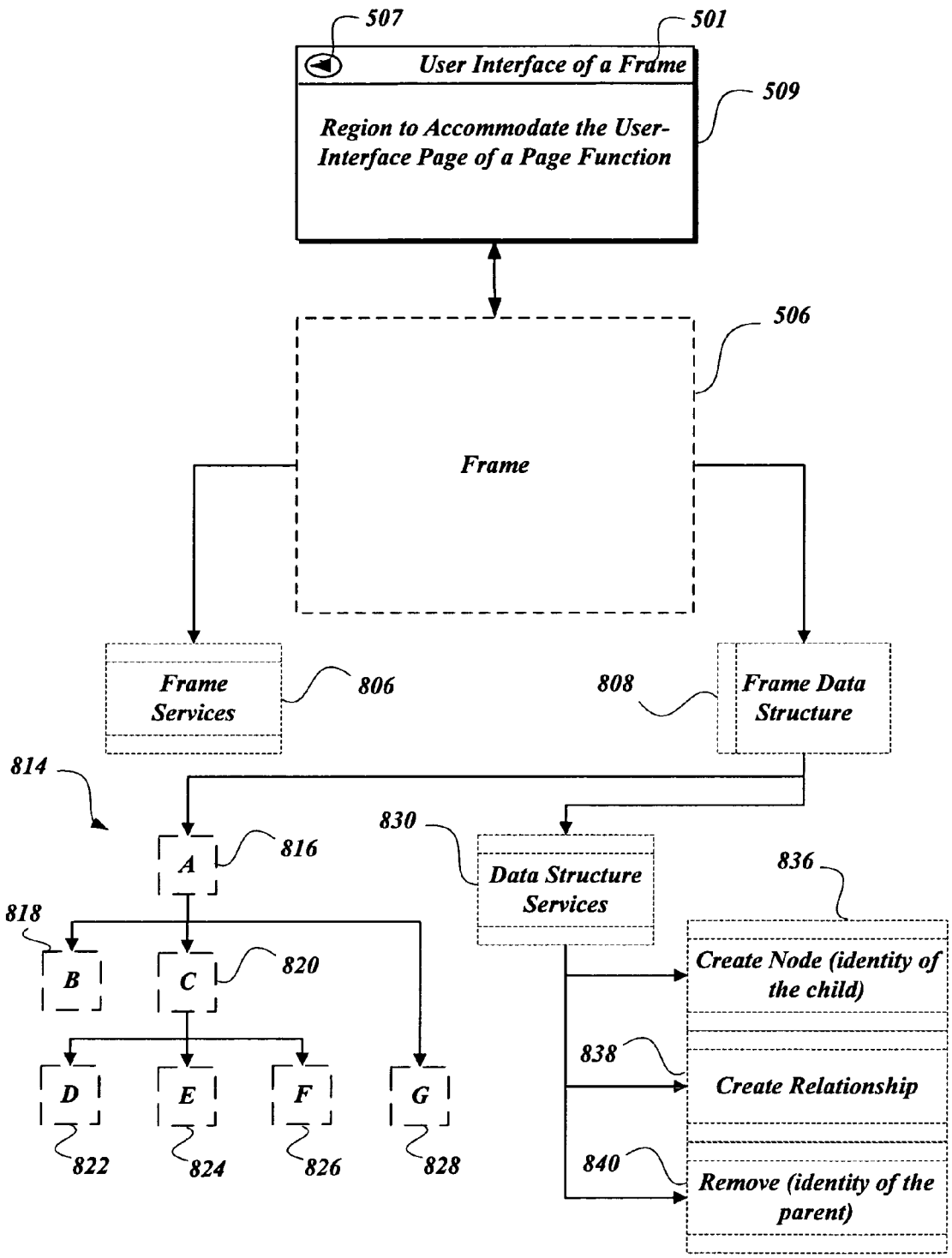
FIG. 8E is a block diagram illustrating in greater detail the services for the frame data structure, according to one embodiment of the present invention.

The frame data structure 808 also includes a set of data structure services 830, which is shown in detail in FIG. 8E. The set of data structure services include at least a create node service 836, a create relationship service 838 and a remove service 840. The create node service 836 is invoked whenever the navigate service 810 is invoked. The proper invocation of the create node service 836 includes a parameter that contains the identity of the invoked child page function. This identity of the child function is stored in the identifier 832 of a node created by the create node service 836, and thus each node specifically identifies a child page function to which the frame 506 has navigated. For example, when the parent page function associated with node A 816 navigates to the child page function for which a node has not been created yet in the tree 814, the create node service 836 is invoked to create, for example, node B 818, to represent the child page function to which the frame 506 has navigated. At the same time, the create relationship service 838 is invoked to link node A 816 to node B 818. As a result, the frame 506 knows the parent-child (invocative) relationship between these two nodes.

The remove service 840 includes a parameter that identifies a parent page function. The remove service 840, allows a set of nodes within the tree 814 to be removed from the tree 814 for security purposes or other purposes. For example, it can be difficult or undesirable to allow a user to run through certain page functions to which the user has already visited or navigated. The canonical example here is a user who has just finished buying something on the Web. If at this point he backs up and press the "Order Now" button again, it is not clear whether he meant to change or replace his existing order, or make a second purchase. The clearest thing to do might be to prevent a user from getting into such a situation by removing page functions associated with the buying process by removing the nodes representing these page functions in the tree 814 when the order is successfully placed. As another example, suppose a page function is associated with a network adapter that has just removed. It does not make sense for a node that represent this page function to remain in the tree 814 and this node should be removed. As a further example, suppose nodes C 820, D 822, E 824, F 826 comprise a collection of page functions in a portion of a Web-style application that request a user to input a credit card number in order to purchase a plane ticket. For security purposes, once a purchase has been made, these nodes should be removed. This is accomplished by invoking the remove service 840 and providing the identity of the parent page function associated with node C 820.

FIGS. 10A-10F illustrate, in process form 1000, the protocol for invoking one or more page functions. For clarity purposes, the following description of the process 1000 makes references to various elements illustrated FIG. 9. From a start block 1002, the process 1000 proceeds to a block 1004 where the Web-style application 900 creates the parent page function 906 (hereinafter "parent 906"). An identifier that uniquely identifies the parent 906 is also created by the Web-style application 900. Next, at block 1006, the Web-style application 900 requests the frame 904 to navigate to the parent 906. Along with the request to navigate, the Web-style application 900 also provides the identifier of the parent 906 to the frame 904. See block 1008.

In response to the request to navigate, at block 1010, the frame 904 creates a first node to represent the parent 906 in the frame data structure. Because the identifier of the parent 906 was provided, the frame 904 causes the first node in the frame data structure to contain the identifier of the parent 906. See block 1012. Next, the process 1000 proceeds to a block 1014 where the frame 904 activates the parent 906 by invoking the activate service of the parent 906. Here, the process 1000 proceeds to a process continuation terminal ("terminal A"). From terminal A (FIG. 10B), the process 1000 enters a block 1016 where, along with a request to activate the parent 906, the frame 904 provides one or more parameters, which are provided by the Web-style application 900, to the parent. Next, at a decision block 1018, the parent 906 decides whether it has completed its task. If the answer is YES, the process 1000 proceeds to another continuation terminal ("terminal B").

From terminal B (FIG. 10C), the process 1000 proceeds to a block 1032 where the parent 906 notifies the frame 904 that the task of the parent is finished. Along with the notification, the parent 906 sends its identifier to the frame 904. See block 1034. Frame notification is accomplished by the parent 906 invoking the finish service of the frame 904. Next, a test is made (decision block 1036) to determine if the parent 906 has requested that the node representing the parent 906 in the frame data structure and all of the parent's children nodes be removed. If the decision is YES, the process flow proceeds to a block 1038 where the frame 904 removes the node representing the parent 906 and all of the parent's children nodes from the frame data structure. If the decision is NO, or after the parent and its children have been removed from the frame data structure, a block 1040 is entered. At the block 1040, the frame sends an exit signal to the Web-style application 900 indicating that all the tasks have been performed and the Web-style application 900 may exit from the operating system. In response to the exit signal, the Web-style application 900 quits (block 1042), and the process 1000 ends.

Returning to FIG. 10B, if the answer at decision block 1018 is NO, another decision block 1020 is entered. At decision block 1020, the parent 906 decides whether to show the user interface page associated with the parent 906. If the decision is YES, at block 1022 the user interface page of the parent 906 is displayed in the user interface of the frame 904. At this point in the process, the user interface page of the parent 906 waits for the user to provide input. A decision block 1024 along with its NO branch captures this waiting process. When the user interacts with the user interface page of the parent 906, the answer to decision block 1024 is NO and the process loops back to decision block 1024. When the user interacts with the user interface page of the parent 906, the answer to decision block 1024 becomes YES and the process 1000 proceeds to a block 1026. At block 1026, the parent 906 processes the user's action, which was captured by the user interface page of the parent 906. When processing of the user's action is completed, the process 1000 cycles back to decision block 1018.

If the answer to decision block 1020 is NO, the process proceeds to a decision block 1028 where the parent 906 decides whether to create a new page function. If the answer to decision block 1028 is NO, there has been an error. This results in the process proceeding to a block 1030 and the operating system handling the error.

The process proceeds to another continuation terminal ("terminal C") if the answer to decision block 1028 is YES. The flow of the process 1000 from terminal C is in FIG. 10D. From terminal C, at a block 1044, the parent 906 creates a child page function 908 (hereinafter "child 908"). The creation of the child 908 includes the creation of an identifier that uniquely identifies the child 908. After the child 908 has been created, the parent 906 requests the frame 904 to navigate to the child. See block 1046. One suitable technique for making this request is the invocation of the navigate service of the frame 904. Along with the request to navigate, the parent 906 provides the identifier of the parent 906, and the identifier of the child 908 as shown at block 1048.

The process 1000 next proceeds to a block 1050 where the frame 904 creates a second node to represent the child 908 in the frame data structure. Additionally, the frame places the identifier of the child 908 in the second node as shown at block 1052. Further, the frame creates an originator relationship or a link between the first node, which represents the parent 906, and the second node, which represents the child 908. See block 1054. From there, the process 1000 proceeds to another continuation terminal ("terminal D").

Figure 1:
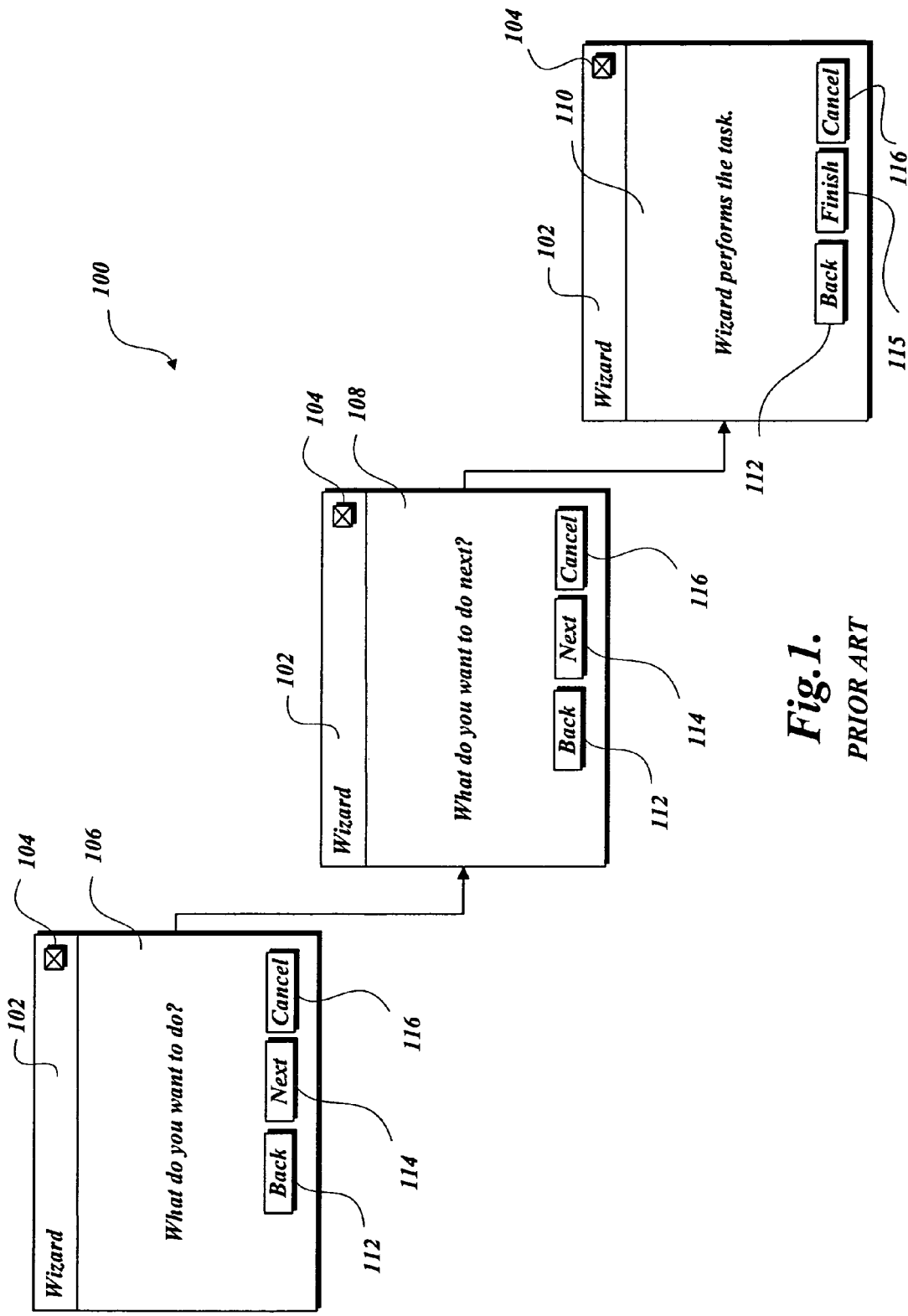
FIG. 1 is a block diagram illustrating a number of screens of a prior art wizard, which is an interactive help utility that guides a user through each step of a particular task.
Figure 10A:
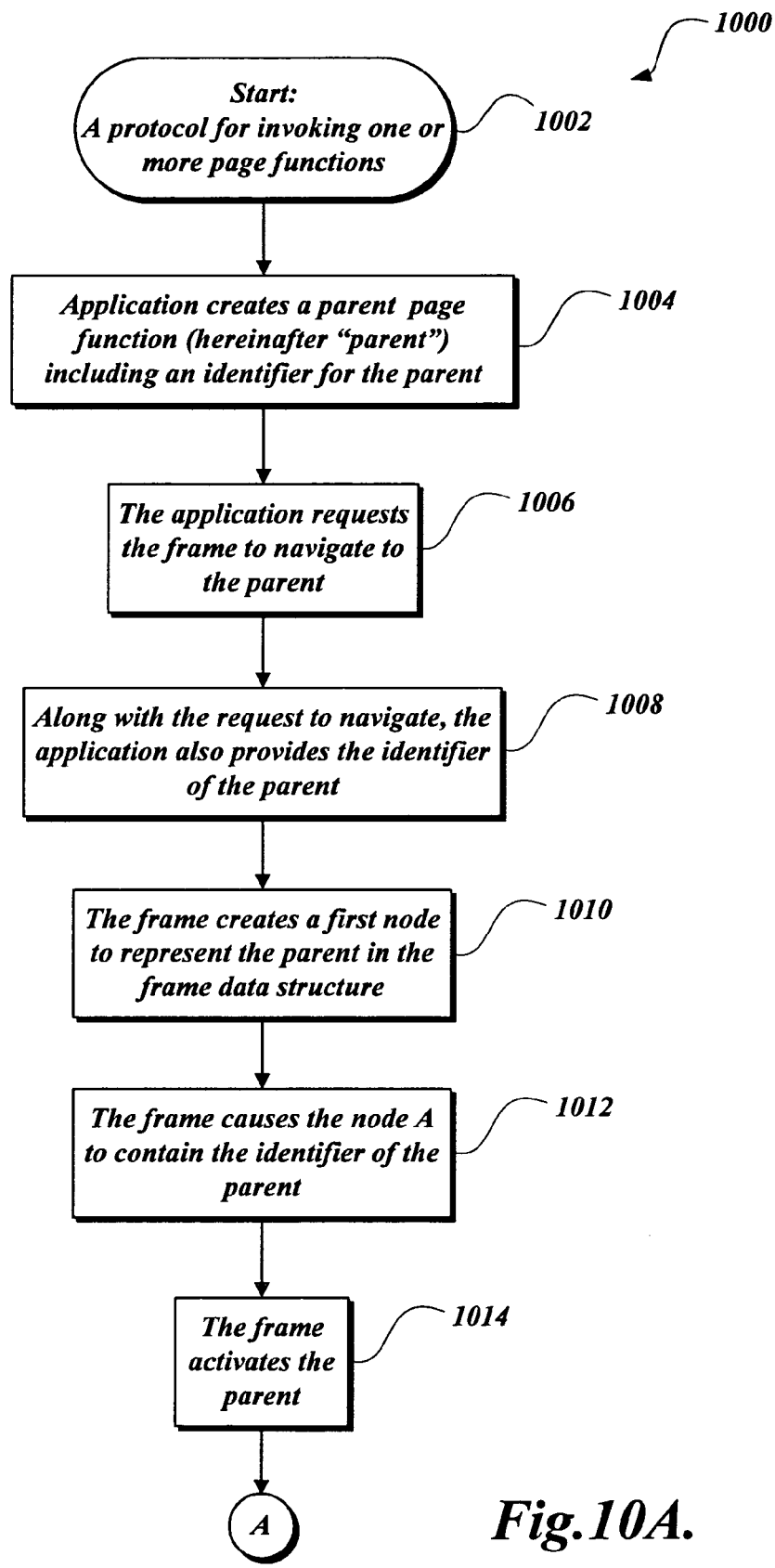
FIGS. 10A-10F are process diagrams illustrating a protocol for invoking one or more page functions, according to one embodiment of the present invention.
Figure 10B:
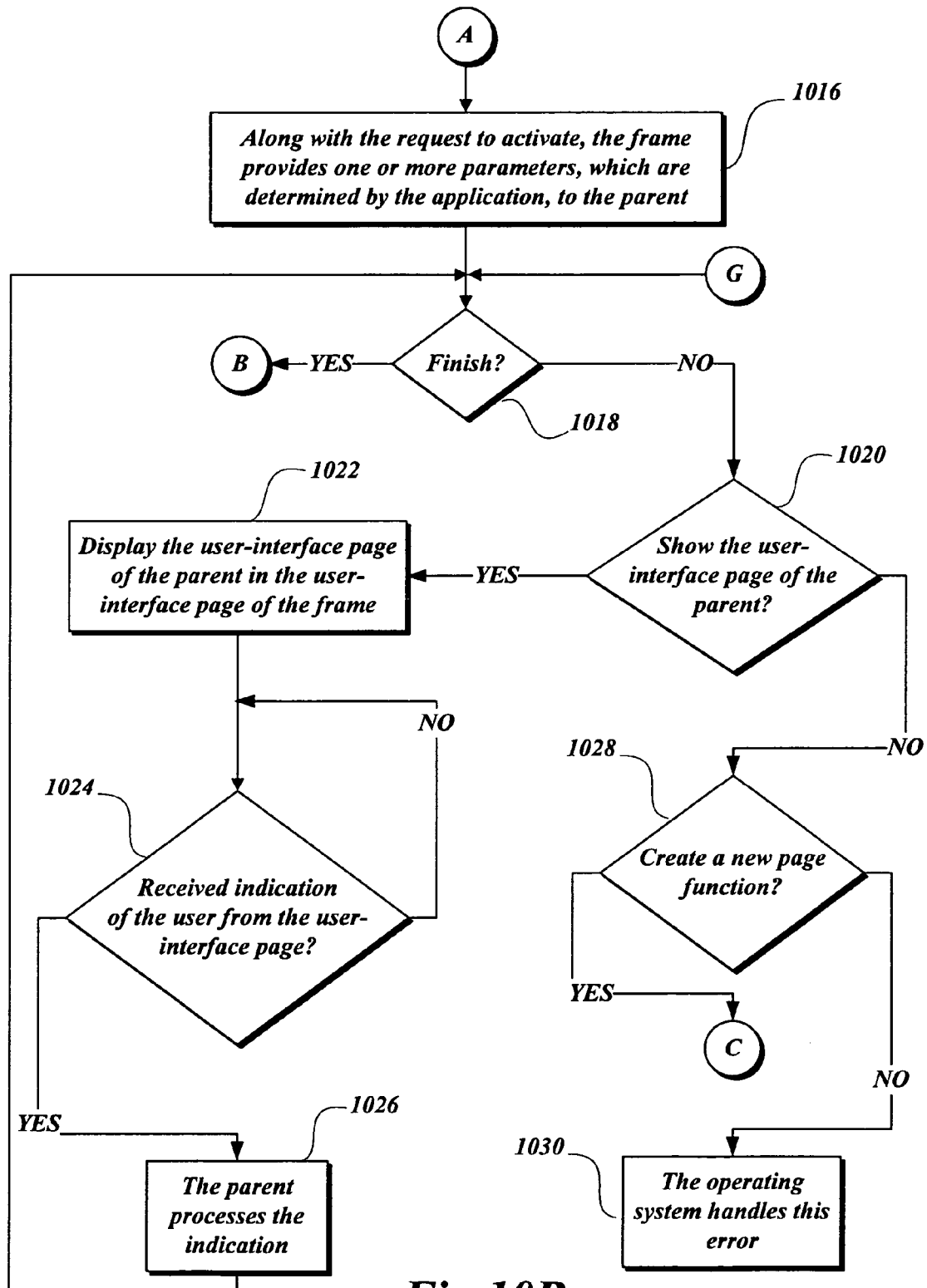
Figure 10C:
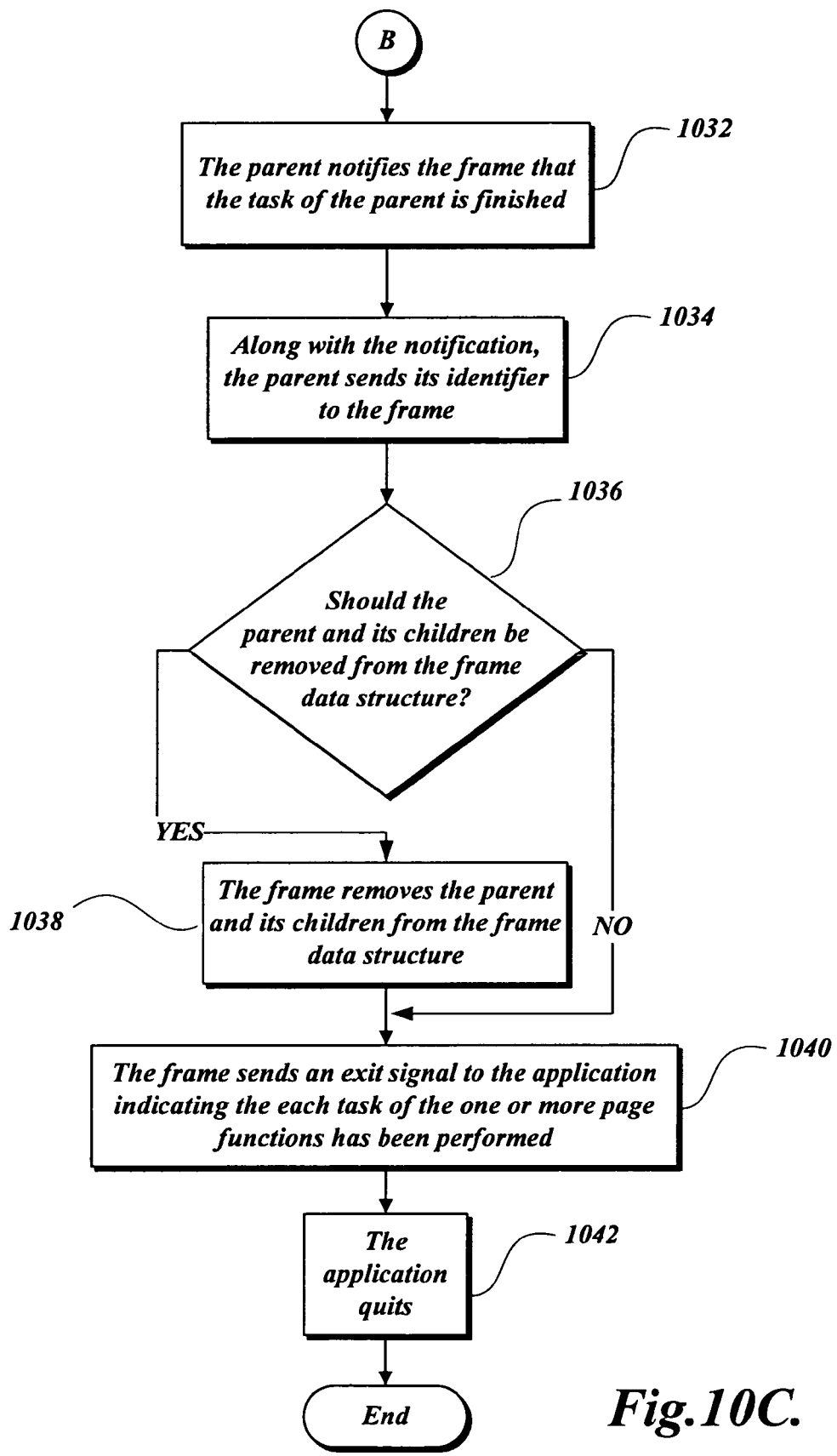
Figure 10D:
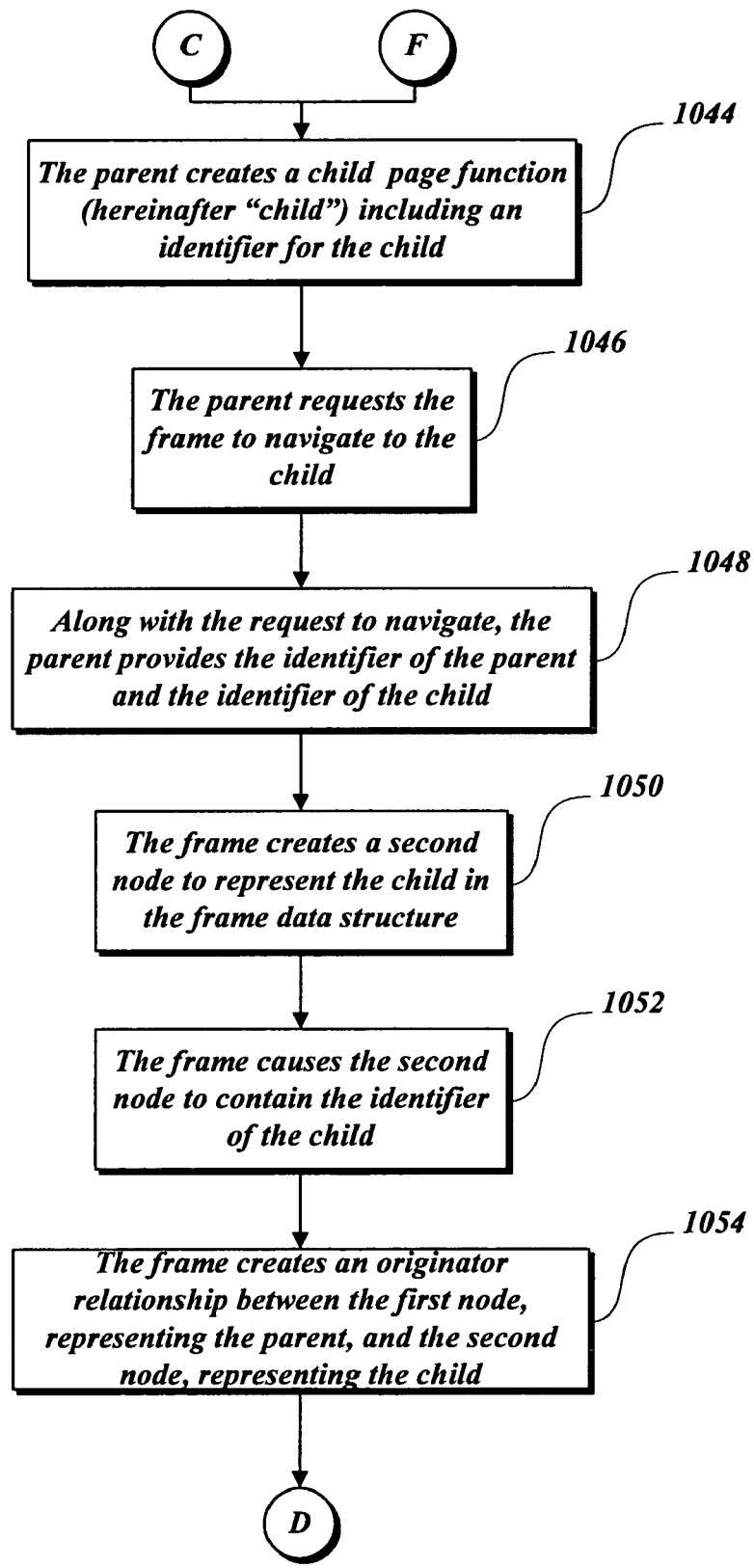
Figure 10E:
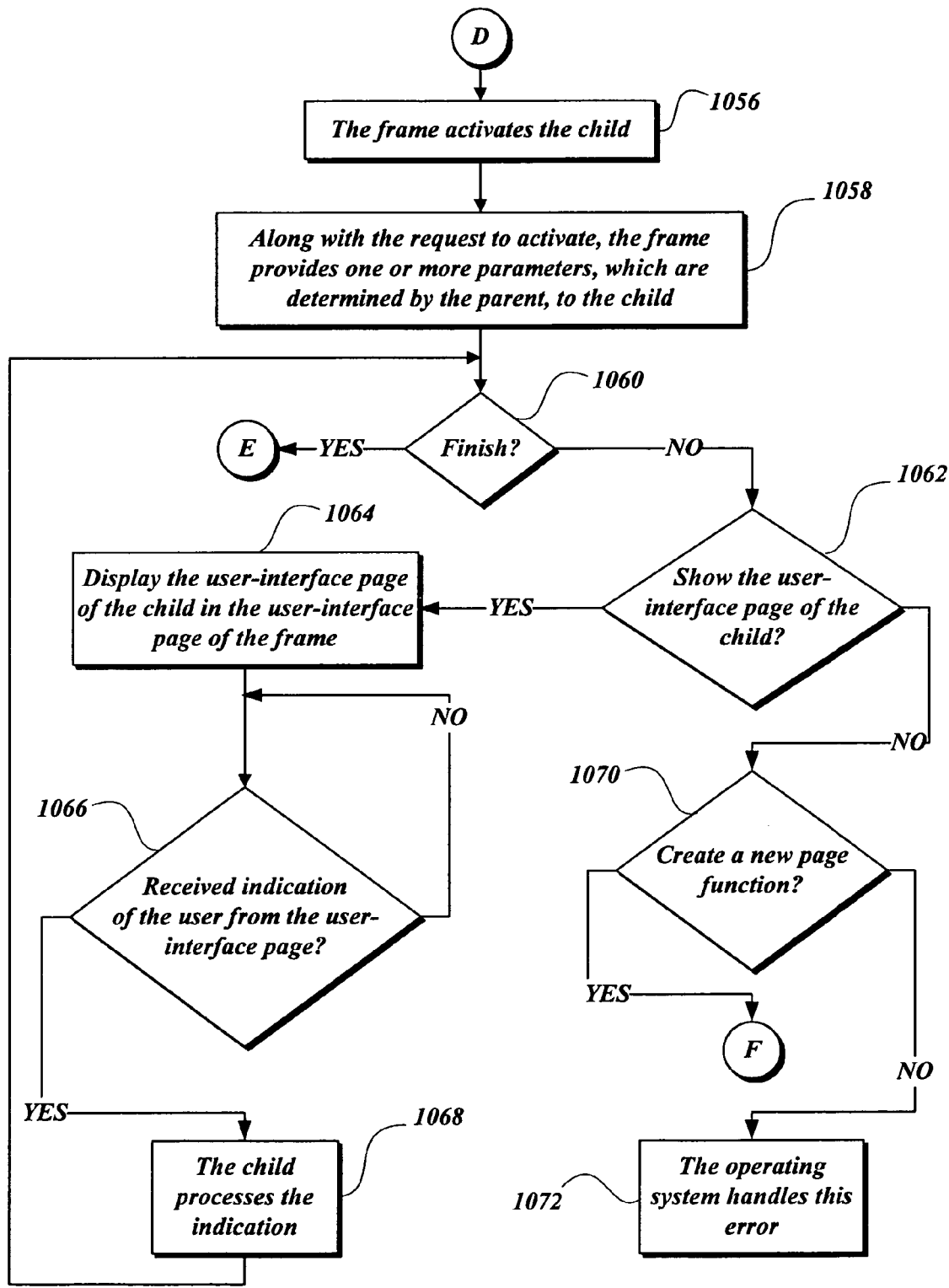
Figure 10F:
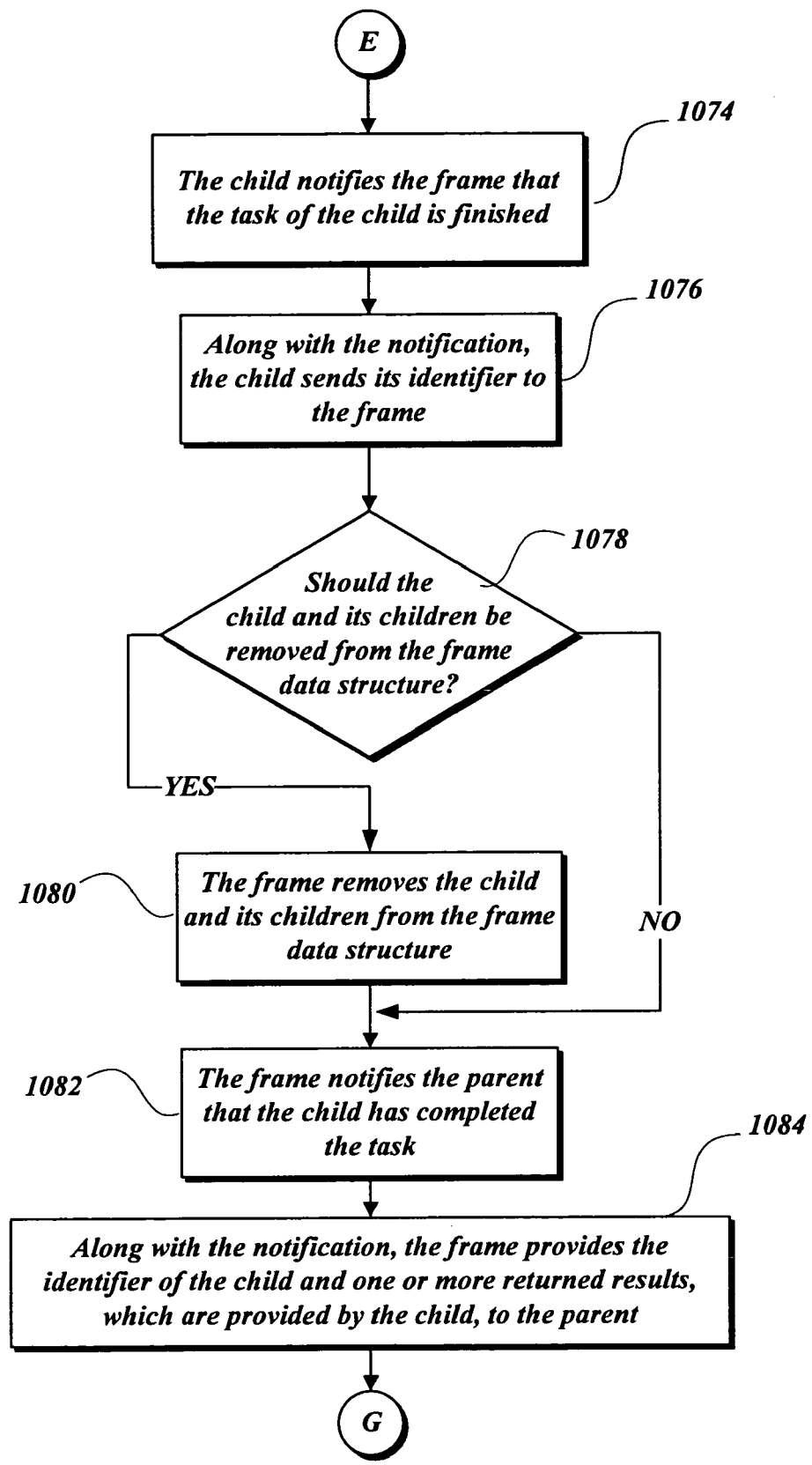

From terminal D (FIG. 1E), at a block 1056, the frame 904 activates the child 908 by invoking the activate service of the child 908. Along with the activation of the child 908, the frame 904 provides one or more parameters, which are determined and provided by the parent 906, to the child 908. See block 1058. One way of passing these parameters is to furnish these parameters as part of the function signature of the activate service, and an alternate way is to directly access the exposed parameters of the child 908 and place information into these exposed parameters. Next, at decision block 1060, a test is made to determine if the child 908 has finished its task. If the answer is YES, the process 1000 proceeds to a further continuation terminal ("terminal E"), which is also illustrated in FIG. 10F.

At a block 1074 (FIG. 10F), the child 908 notifies the frame that the task of the child is finished by invoking a finish service of the frame 904. At the same time, the child 908 sends its identifier to the frame 904. See block 1076. From there, the process 1000 flows to a decision block 1078. At decision block 1078, the child may decides if the child and its children's nodes should be removed from the frame data structure. If the decision is YES, the frame 904 removes the node representing the child 908, and the child's children's nodes from the frame data structure. See block 1080. If the answer is NO or after the child and the child's children's nodes have been removed from the frame data structure, the frame 904 notifies the parent 906 that the child 908 has completed the task. See block 1082. One suitable notification technique is to invoke a complete service of the parent 906. If the child has one or more returned results from the performance of the task, those results are returned at the time the frame notifies the parent 906 via the invocation of the complete service. One technique for the child to return these returned results is for the parent to passed to the child a call-back function at the time the child is activated. The call-back function contains parameters in which the child may place the returned results. To send the results back to the parent, the child simply invokes the call-back function. Other techniques are also suitable. Also, at the same time the child identifier is provided to the parent 906 by the frame 904. These activities occur at a block 1084. From here, the process 1000 proceeds to another continuation terminal ("terminal G"), which brings the process 1000 back to decision block 1018 (FIG. 10B).

Returning to FIG. 10E, if the answer to decision block 1060 is NO, at block 1062 a test is made to determine if the user interface page of the child 908 is to be shown. If the answer to decision block 1062 is YES, the child 908 displays its user interface page in the user interface of the frame 904. See block 1064. From here, the process 1000 waits (decision block 1066) for a user to interact with the user interface page of the child 908. If no interaction occurs, the process 1000 continues to loop around decision block 1066. When the user interacts with the user interface page of the child 908, the child 908 processes the interaction (block 1068) and the process loops back to decision block 1060.

If the answer to decision block 1062 is NO, the child 908 decides whether it desires to create a new page function. See decision block 1070. If the answer is NO, there has been an error. As a result, the process proceeds to block 1072 and the operating system handles the error. Otherwise, the process proceeds to a further continuation terminal ("terminal F"). The process of creating a new page function has already been described with reference to FIG. 10D.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. For use in a computer system including a display, a user input facility, and an application for presenting user interfaces on the display, one or more page functions of a web-style application being stored on a computer-readable storage medium as a data type, each page function comprising:
   a set of exposed attributes accessible externally to the page function of the web-style application, a first subset of the set of exposed attributes defining types of information receivable by the page function, a second subset of the set of exposed attributes defining types of information returnable by the page function;
   a set of page function services including an activate service and a complete service, both services being invocable to execute a decision including at least one of a decision to finish, a decision to show a user interface page, and a decision to create a new page function, wherein upon a first page function of the web-style application executing the decision to create a new page function, the activate service of a second page function of the web-style application is invoked such that control passes to the second page function, and further upon the second page function executing the decision to finish, the complete service of the first page function is invoked such that control passes back to the first page function without displaying a launching page of the web-style application; and a binding selectively coupled to a user interface page, such that upon the binding being coupled to the user interface page and upon the page function executing the decision to show a user interface page, the user interface page is displayed, and such that upon the binding not being coupled to the user interface page, the user interface page is not displayed.

2. The computer-readable storage medium of claim 1, wherein the activate service has a set of parameters, each corresponding to one of the first subset of exposed attributes.

3. The computer-readable storage medium of claim 1, wherein the complete service has a set of parameters, a portion of the set of parameters identifying another page function created by the page function to perform a second task, another portion of the set of parameters corresponding to one of the second subset of exposed attributes.

4. The computer-readable storage medium of claim 1, further comprising an identifier for identifying each instance of the page function.

5. The computer-readable storage medium of claim 1, wherein the binding is not coupled to a user interface page such that no user interface page is displayed while the page function is active.

6. The computer-readable storage medium of claim 5 wherein the second page function becomes active when control passes to the second page function and the second page function becomes inactive upon executing the finish decision.

* * * * *